US012470899B2

(12) United States Patent
Yu et al.

(10) Patent No.: US 12,470,899 B2
(45) Date of Patent: Nov. 11, 2025

(54) ALTERNATIVE COORDINATE SYSTEM FOR SENSOR SHARING

(71) Applicant: QUALCOMM INCORPORATED, San Diego, CA (US)

(72) Inventors: Lan Yu, Beijing (CN); Hong Cheng, Basking Ridge, NJ (US); Gene Wesley Marsh, San Diego, CA (US); Dan Vassilovski, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 284 days.

(21) Appl. No.: 18/246,027

(22) PCT Filed: Nov. 5, 2020

(86) PCT No.: PCT/CN2020/126677
§ 371 (c)(1),
(2) Date: Mar. 20, 2023

(87) PCT Pub. No.: WO2022/094836
PCT Pub. Date: May 12, 2022

(65) Prior Publication Data
US 2023/0362605 A1    Nov. 9, 2023

(51) Int. Cl.
*G01S 5/02*     (2010.01)
*G01S 5/00*     (2006.01)
(Continued)

(52) U.S. Cl.
CPC ............. *H04W 4/38* (2018.02); *G01S 5/0072* (2013.01); *G01S 5/0244* (2020.05); *G01S 5/0289* (2013.01); *H04W 4/029* (2018.02)

(58) Field of Classification Search
CPC .... G01S 5/0244; G01S 5/0072; G01S 5/0289; H04W 4/38; H04W 4/029
(Continued)

(56) References Cited

U.S. PATENT DOCUMENTS 10,796,501 B2    10/2020   Cheng et al.
2019/0069051 A1   2/2019   Al-Stouhi et al.
(Continued)

FOREIGN PATENT DOCUMENTS

CN    109118794 A  *  1/2019  .......... G01S 5/0205
CN    109426258 A      3/2019
(Continued)

OTHER PUBLICATIONS

Supplementary European Search Report—EP20960297—Search Authority—Munich—Jun. 24, 2024 (208271EP).
(Continued)

*Primary Examiner* — Harry K Liu
(74) *Attorney, Agent, or Firm* — Holland & Hart LLP

(57) ABSTRACT

Methods, systems, and devices for wireless communications are described. A user equipment (UE) may detect an object and determine to share position information associated with the object with one or more UEs. The UE may select a reference entity detectable by one or more other UEs and determine the position of the detected object relative to the position of the selected reference entity. The UE may transmit, to one or more second UEs, a sensor sharing message that includes the position information of the object relative to the selected reference entity and an indication of the selected reference entity. The one or more second UEs may detect the position of the reference entity and determine the location of the detected object based on the position of the reference entity and the position of the detected object relative to the position of the reference entity.

29 Claims, 13 Drawing Sheets

(51) Int. Cl.
*H04W 4/029* (2018.01)
*H04W 4/38* (2018.01)

(58) Field of Classification Search
USPC .......................................................... 342/451
See application file for complete search history.

(56) References Cited

U.S. PATENT DOCUMENTS

2020/0082176 A1*   3/2020   Frederick ................ B60R 11/04
2020/0267682 A1    8/2020   Manolakos et al.

FOREIGN PATENT DOCUMENTS

| CN | 109932741 A    | 6/2019  |              |
|----|----------------|---------|--------------|
| CN | 110754074 A    | 2/2020  |              |
| CN | 111856540 A    | 10/2020 |              |
| CN | 110754074 B *  | 5/2022  | ............. G07C 5/008 |
| WO | WO-2013096138 A1 | 6/2013 |              |
| WO | WO-2018236736  | 12/2018 |              |
| WO | WO-2020050931 A1 | 3/2020 |              |
| WO | WO-2020068802 A1 * | 4/2020 | ......... H04L 12/4633 |
| WO | WO-2020117432 A1 * | 6/2020 | ........... G05D 1/0022 |

OTHER PUBLICATIONS

International Search Report and Written Opinion—PCT/CN2020/126677—ISA/EPO—Aug. 4, 2021 (208271WO1).
Qualcomm Incorporated: "FS_mV2X—Sensor Sharing of Object Information", 3GPP SA4#99 Meeting, Tdoc S4-180676, Jul. 9-13, 2018, Rome, Italy, the Whole Document, 4 Pages, The whole document.

* cited by examiner

ALTERNATIVE COORDINATE SYSTEM FOR SENSOR SHARING

CROSS REFERENCE

The present application is a 371 national stage filing of International PCT Application No. PCT/CN2020/126677 by YU et al. entitled "ALTERNATIVE COORDINATE SYSTEM FOR SENSOR SHARING," filed Nov. 5, 2020, which is assigned to the assignee hereof, and which is expressly incorporated by reference in its entirety herein.

FIELD OF TECHNOLOGY

The following relates to wireless communications, an in particular an alternative coordinate system for sensor sharing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, such as in a vehicle-to-everything (V2X) system, a UE may share position information of a perceived object with one or more other UEs. For example, the UE may detect the position of the object relative to the position of the UE and may send sensor sharing information indicating the detected position of the object. A UE may receive the shared position information from the sending UE and determine the position of the perceived object relative to the receiving UE. By determining the object's position based on the positions of the UEs (e.g., the UE sending the sensor sharing information and the UE receiving the sensor sharing information), a UE may rely on positioning systems, such as a global positioning system (GPS), a global navigation satellite system (GNSS), or both. In some cases, the error associated with determining absolute positions of UEs using positioning systems may be relatively large (e.g., on the scale of one or more meters). A large absolute position error for an object may negatively impact UE decision-making related to the object, significantly impacting safety and driving decisions for the UE.

SUMMARY

The described techniques relate to improved methods, systems, devices, and apparatuses that support an alternative coordinate system for sensor sharing. Generally, the described techniques provide for sharing sensor information to communicate position information related to a perceived object relative to the position of a common reference entity. A user equipment (UE) may detect an object and determine to share position information associated with the object with one or more other UEs. The UE may select a reference entity detectable by one or more other UEs and determine the position of the detected object relative to the position of the selected reference entity. The UE may transmit, to the one or more other UEs, a sensor sharing message (SSM) that includes the position information of the object relative to the selected reference entity and an indication of the selected reference entity. The one or more other UEs may detect the position of the reference entity and determine the location of the object based on the detected position of the reference entity and the indicated position of the object relative to the reference entity included in the SSM. In this way, a UE receiving the SSM may determine the position of an object based on sensor detection measurements (e.g., for the object and the reference entity), as opposed to using positioning system measurements for the UEs. Because the scale of potential errors associated with a sensor may be significantly smaller than the scale of potential errors associated with a positioning system, using the alternative coordinate system relative to the reference entity may improve the accuracy of object detection, effectively improving safety and driving decisions at the UEs.

A method of wireless communications at a first UE is described. The method may include detecting an object, selecting a reference entity detectable by a second UE, determining a position of the object relative to the selected reference entity, and transmitting, to the second UE, a sensor sharing message including the position of the object relative to the selected reference entity and an indication of the selected reference entity.

An apparatus for wireless communications at a first UE is described. The apparatus may include a processor, memory coupled with the processor, and instructions stored in the memory. The instructions may be executable by the processor to cause the apparatus to detect an object, select a reference entity detectable by a second UE, determine a position of the object relative to the selected reference entity, and transmit, to the second UE, a sensor sharing message including the position of the object relative to the selected reference entity and an indication of the selected reference entity.

Another apparatus for wireless communications at a first UE is described. The apparatus may include means for detecting an object, selecting a reference entity detectable by a second UE, determining a position of the object relative to the selected reference entity, and transmitting, to the second UE, a sensor sharing message including the position of the object relative to the selected reference entity and an indication of the selected reference entity.

A non-transitory computer-readable medium storing code for wireless communications at a first UE is described. The code may include instructions executable by a processor to detect an object, select a reference entity detectable by a second UE, determine a position of the object relative to the selected reference entity, and transmit, to the second UE, a sensor sharing message including the position of the object relative to the selected reference entity and an indication of the selected reference entity.

In some examples of the method, apparatuses, and non-transitory computer-readable medium described herein, determining the position of the object relative to the selected reference entity may include operations, features, means, or instructions for determining a first position of the object relative to the first UE, determining a second position of the selected reference entity relative to the first UE, and calculating the position of the object relative to the selected reference entity based on the first position and the second position.

In some examples of the method, apparatuses, and non-transitory computer-readable medium described herein, the position of the object relative to the selected reference entity includes a first position of the object, and the sensor sharing message further includes a second position of the object relative to the first UE and an absolute position of the first UE.

Some examples of the method, apparatuses, and non-transitory computer-readable medium described herein may further include operations, features, means, or instructions for determining the absolute position of the first UE using a positioning system, where the positioning system includes a global positioning system, a global navigation satellite system, or both.

Some examples of the method, apparatuses, and non-transitory computer-readable medium described herein may further include operations, features, means, or instructions for determining an accuracy level for the absolute position of the first UE based on a positioning system for the first UE, the sensor sharing message further including an indication of the accuracy level for the absolute position of the first UE.

In some examples of the method, apparatuses, and non-transitory computer-readable medium described herein, the sensor sharing message further includes an indication of an accuracy level for the position of the object.

In some examples of the method, apparatuses, and non-transitory computer-readable medium described herein, the indication of the selected reference entity includes a position of the selected reference entity relative to the first UE, and the sensor sharing message further includes an indication of an accuracy level for the position of the selected reference entity.

In some examples of the method, apparatuses, and non-transitory computer-readable medium described herein, selecting the reference entity may include operations, features, means, or instructions for selecting the reference entity based on a predicted observability metric associated with the reference entity.

In some examples of the method, apparatuses, and non-transitory computer-readable medium described herein, selecting the reference entity may include operations, features, means, or instructions for receiving, from a set of UEs, a set of sensor sharing messages including respective lists of detected entities, and selecting the reference entity from a set of candidate entities common to the respective lists of detected entities for the set of sensor sharing messages.

In some examples of the method, apparatuses, and non-transitory computer-readable medium described herein, selecting the reference entity may include operations, features, means, or instructions for receiving, from a set of UEs, a set of indicators associated with respective local high-definition maps for the set of UEs, and selecting the reference entity from a set of candidate entities marked in each local high-definition map of the respective local high-definition maps for the set of UEs based on the set of indicators.

In some examples of the method, apparatuses, and non-transitory computer-readable medium described herein, selecting the reference entity may include operations, features, means, or instructions for transmitting, to the second UE, a first sensor sharing message indicating a set of candidate entities, where the sensor sharing message includes a second sensor sharing message, receiving, from the second UE, a response message indicating a preferred entity of the set of candidate entities, and selecting the reference entity based on the preferred entity.

Some examples of the method, apparatuses, and non-transitory computer-readable medium described herein may further include operations, features, means, or instructions for transmitting, to the second UE, a first sensor sharing message indicating a capability of the first UE to transmit the position of the object relative to the selected reference entity, where the sensor sharing message includes a second sensor sharing message, and receiving, from the second UE, a response message including an interest indicator for receiving the position of the object relative to the selected reference entity, where the second sensor sharing message includes the position of the object relative to the selected reference entity based on the interest indicator.

In some examples of the method, apparatuses, and non-transitory computer-readable medium described herein, the response message further may include operations, features, means, or instructions for selecting the reference entity based on the set of candidate entities.

In some examples of the method, apparatuses, and non-transitory computer-readable medium described herein, the object may be detected using a sensor equipped to the first UE, the sensor including a laser incident detection and ranging sensor, a radar sensor, a camera-based sensor, a long range scanning sensor, a forward-mounted object detection sensor, a mid-range blind spot detection sensor, a long-range lane change assist sensor, or any combination thereof.

Some examples of the method, apparatuses, and non-transitory computer-readable medium described herein may further include operations, features, means, or instructions for detecting the reference entity using the sensor, and determining to transmit the position of the object relative to the selected reference entity in the sensor sharing message based on detecting both the object and the reference entity using a same sensor.

Some examples of the method, apparatuses, and non-transitory computer-readable medium described herein may further include operations, features, means, or instructions for receiving, from a roadside unit, an absolute position of the selected reference entity, where the position of the object relative to the selected reference entity may be determined based on the absolute position of the selected reference entity.

In some examples of the method, apparatuses, and non-transitory computer-readable medium described herein, the selected reference entity corresponds to a fixed position, and the object includes a vulnerable road user, a vehicle, an obstacle, or a combination thereof.

A method of wireless communications at a first UE is described. The method may include receiving, from a second UE, a sensor sharing message including an indication of a selected reference entity and a first position of an object relative to the selected reference entity, detecting a second position of the selected reference entity relative to the first UE, and determining a third position of the object relative to the first UE based on the first position of the object and the second position of the selected reference entity.

An apparatus for wireless communications at a first UE is described. The apparatus may include a processor, memory coupled with the processor, and instructions stored in the memory. The instructions may be executable by the processor to cause the apparatus to receive, from a second UE, a sensor sharing message including an indication of a selected reference entity and a first position of an object relative to the selected reference entity, detect a second position of the selected reference entity relative to the first UE, and determine a third position of the object relative to the first UE based on the first position of the object and the second position of the selected reference entity.

Another apparatus for wireless communications at a first UE is described. The apparatus may include means for receiving, from a second UE, a sensor sharing message including an indication of a selected reference entity and a first position of an object relative to the selected reference entity, detecting a second position of the selected reference entity relative to the first UE, and determining a third position of the object relative to the first UE based on the first position of the object and the second position of the selected reference entity.

A non-transitory computer-readable medium storing code for wireless communications at a first UE is described. The code may include instructions executable by a processor to receive, from a second UE, a sensor sharing message including an indication of a selected reference entity and a first position of an object relative to the selected reference entity, detect a second position of the selected reference entity relative to the first UE, and determine a third position of the object relative to the first UE based on the first position of the object and the second position of the selected reference entity.

In some examples of the method, apparatuses, and non-transitory computer-readable medium described herein, the sensor sharing message further includes a fourth position of the object relative to the second UE and an absolute position of the second UE.

In some examples of the method, apparatuses, and non-transitory computer-readable medium described herein, the sensor sharing message further may include operations, features, means, or instructions for determining to use the first position of the object to determine the third position of the object relative to the first UE based on the accuracy level for the absolute position of the second UE satisfying a threshold value.

In some examples of the method, apparatuses, and non-transitory computer-readable medium described herein, the sensor sharing message further may include operations, features, means, or instructions for determining to use the first position of the object to determine the third position of the object relative to the first UE based on the accuracy level for the first position of the object satisfying a threshold value.

In some examples of the method, apparatuses, and non-transitory computer-readable medium described herein, the indication of the selected reference entity includes a fourth position of the selected reference entity relative to the second UE, and the second position of the selected reference entity relative to the first UE may be detected based on the fourth position of the selected reference entity relative to the second UE.

Some examples of the method, apparatuses, and non-transitory computer-readable medium described herein may further include operations, features, means, or instructions for transmitting, to the second UE, a first sensor sharing message including a list of detected entities, where the sensor sharing message includes a second sensor sharing message and the selected reference entity may be selected from the list of detected entities.

Some examples of the method, apparatuses, and non-transitory computer-readable medium described herein may further include operations, features, means, or instructions for transmitting, to the second UE, an indicator associated with a local high-definition map, where the selected reference entity may be selected from a set of candidate entities marked in the local high-definition map.

Some examples of the method, apparatuses, and non-transitory computer-readable medium described herein may further include operations, features, means, or instructions for receiving, from the second UE, a first sensor sharing message indicating a set of candidate entities, where the sensor sharing message includes a second sensor sharing message, and transmitting, to the second UE, a response message indicating a preferred entity of the set of candidate entities, where the selected reference entity may be based on the preferred entity.

Some examples of the method, apparatuses, and non-transitory computer-readable medium described herein may further include operations, features, means, or instructions for receiving, from the second UE, a first sensor sharing message indicating a capability of the first UE to transmit the first position of the object relative to the selected reference entity, where the sensor sharing message includes a second sensor sharing message, and transmitting, to the second UE, a response message including an interest indicator for receiving the first position of the object relative to the selected reference entity, where the second sensor sharing message includes the first position of the object relative to the selected reference entity based on the interest indicator.

Some examples of the method, apparatuses, and non-transitory computer-readable medium described herein may further include operations, features, means, or instructions for selecting a set of candidate entities, where the response message further includes the set of candidate entities and the selected reference entity may be based on the set of candidate entities.

Some examples of the method, apparatuses, and non-transitory computer-readable medium described herein may further include operations, features, means, or instructions for detecting the selected reference entity using a sensor equipped to the first UE, the sensor including a laser incident detection and ranging sensor, a radar sensor, a camera-based sensor, a long range scanning sensor, a forward-mounted object detection sensor, a mid-range blind spot detection sensor, a long-range lane change assist sensor, or any combination thereof.

In some examples of the method, apparatuses, and non-transitory computer-readable medium described herein, the selected reference entity corresponds to a fixed position, and the object includes a vulnerable road user, a vehicle, an obstacle, or a combination thereof.

DETAILED DESCRIPTION

Figure 1:
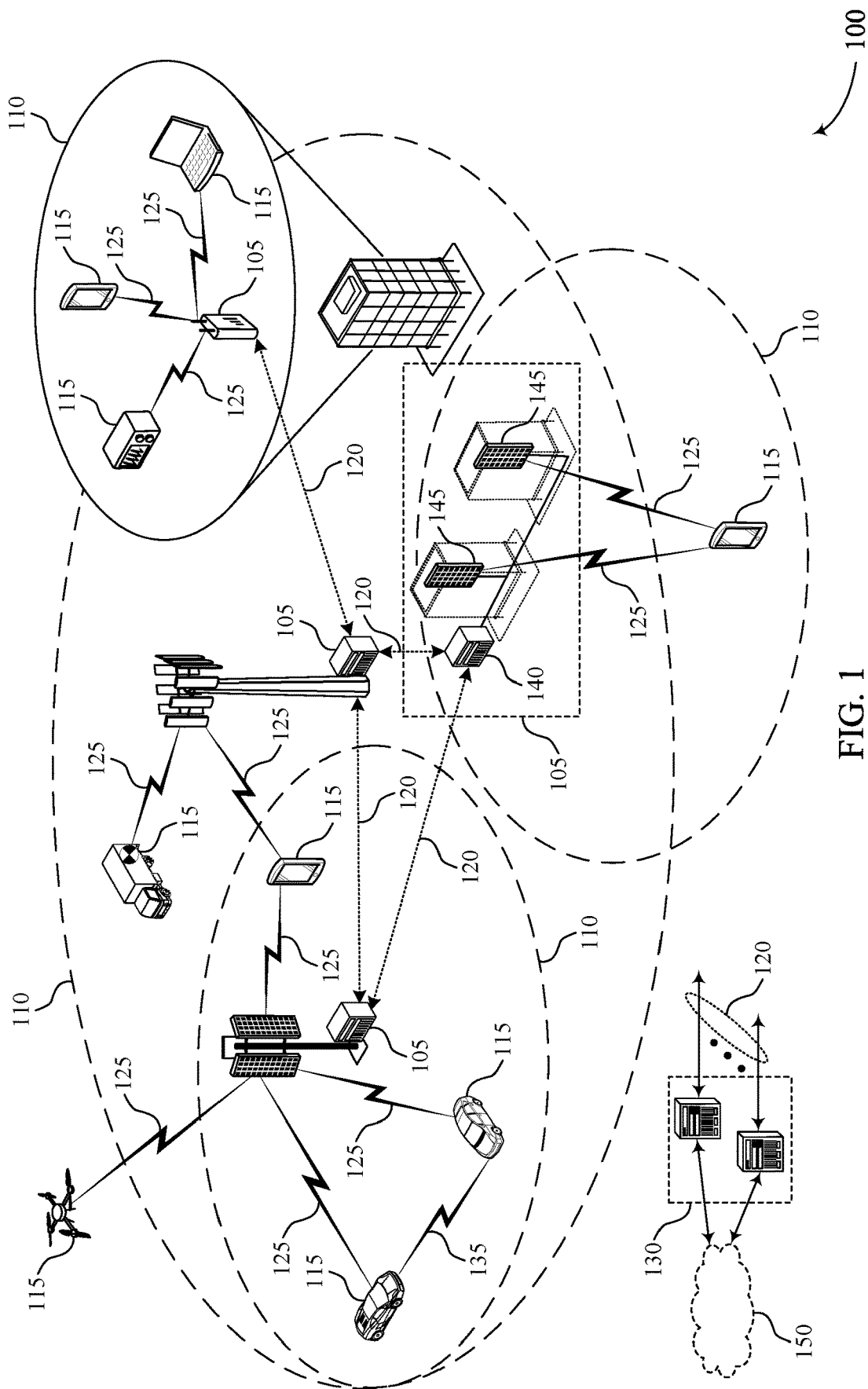
FIGS. 1-4 illustrate examples of wireless communications systems that support an alternative coordinate system for sensor sharing in accordance with aspects of the present disclosure.

Wireless communications systems may include or support networks used for vehicle-based communications, such as vehicle-to-everything (V2X) communications, vehicle-to-vehicle (V2V) communications, cellular V2X (CV2X) communications, or similar communications. Some vehicles may be manufactured or modified to support V2X and may be equipped with sensors including cameras, radar, laser incident detection and ranging (lidar), ultrasound, or some combination thereof. These sensors may be used to detect the environment around a vehicle, including other vehicles, obstacles, and road users (e.g., pedestrians, cyclists, etc.), which may also be referred to as vulnerable road users (VRUs). A vehicle, which may also be referred to herein as a user equipment (UE), may follow application-layer protocols for V2X sensor-sharing. Sensor sharing between UEs may include the dissemination of information about detected vehicles, VRUs, and/or other objects by the sensors on one or more UEs. A UE may share sensor information with one or more other UEs via sensor sharing messages (SSMs), and the one or more other UEs may make decisions, such as automated driving decisions, based on the shared sensor information.

A UE may detect a perceived object (e.g., a VRU, a vehicle, wildlife, a stationary object, an obstacle, or some other object) and the UE may share position information of the perceived object with one or more other UEs via an SSM. In some cases, the UE may measure the position of the object relative to the absolute position of the UE, where the absolute position of the UE is a geographic coordinate determined by a positioning system, such as a global positioning system (GPS), a global navigation satellite system (GNSS), or both. The UE may transmit an indication of the position of the perceived object to one or more receiving UEs, where the indicated position is relative to the absolute position of the UE. However, in some cases, absolute position error may be large relative to sensor error. For example, an absolute position determined based on GPS signaling may include an error on the scale of four to five meters, while a sensor (e.g., camera, radar, lidar, or other sensor) may be accurate to within a few centimeters. In some cases, the error contribution from absolute position errors may negatively impact the ability of a UE receiving the SSM to use the shared sensor information to improve performance. For example, the error contribution from absolute position errors may negatively impact UE decisions (e.g., based on the UE inaccurately determining the position of an object), potentially negatively impacting safety and driving planning of the UE.

According to techniques described herein, a UE may share the position of a perceived object with one or more other UEs independent of the absolute positions of the sensing UE and the receiving UEs. The UE may determine the relative position of a perceived object relative to the position of a common reference point, such as a roadside feature that may be detected by both the sensing UE (e.g., the UE determining sensor sharing information to include in an SSM) and the one or more receiving UEs (e.g., the UEs receiving the SSM). The common reference point may be used as the basis for an alternative coordinate system to represent the location of the perceived object. The sensing UE may transmit, in an SSM, an indication of the common reference point and an indication of the position of the perceived object relative to the common reference point to one or more receiving UEs.

Based on the information in the SSM, the receiving UE may determine the position of the common reference point relative to the receiving UE and determine the position of the perceived object relative to the receiving UE based on the indicated position of the object relative to the common reference point. In some cases, determining the position of the object based on the relative position of the object to a common reference point may enable communicating the position of a perceived object independent of the absolute position of one or more UEs. As such, the error associated with determining the position of the perceived object relative to the receiving UE may include sensor error from detecting the common reference point and sensor error from determining the position of the perceived object relative to the common reference point. In some cases, sensor errors may be smaller than absolute position errors from a positioning system. In such cases, communicating the position of the object relative to the common reference point may improve system performance compared to communicating the position of the object based on absolute position of one or more UEs, as the receiving UEs may determine more accurate positioning information for objects. Improved accuracy for object positions may support improved safety and automated driving operations for the UEs.

Aspects of the disclosure are initially described in the context of wireless communications systems. Aspects of the disclosure are further illustrated by and described with reference to a process flow diagram. Aspects of the disclosure are further illustrated by and described with reference to apparatus diagrams, system diagrams, and flowcharts that relate to an alternative coordinate system for sensor sharing.

FIG. 1 illustrates an example of a wireless communications system 100 that supports an alternative coordinate system for sensor sharing in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some systems, UEs 115 may share sensor-based information with other UEs 115 over a D2D communication link 135. For example, the D2D communication link 135 may be an example of a sidelink communication link, such as a V2X or V2V communication link (e.g., if the UEs 115 are examples of vehicles or components of vehicles in a V2X system). A UE 115 may periodically or aperiodically share sensor-based information to alert other UEs 115 about aspects of the UE's environment detected using one or more sensors. For example, the UE 115 may be equipped with one or more of a lidar sensor, a radar sensor, a camera-based sensor, a long range scanning sensor, a forward-mounted object detection sensor, a mid-range blind spot detection sensor, a long-range lane change assist sensor, or any combination thereof.

If a UE 115 detects an object (e.g., a VRU, a vehicle, wildlife, a stationary object, an obstacle, or some other object), the UE 115 may share position information of the perceived object with one or more other UEs 115 via an SSM. In some cases, the UE 115 may measure the position of the object relative to the absolute position of the UE 115, where the absolute position of the UE 115 is a geographic coordinate determined by a positioning system, such as a GPS, a GNSS, or both. The UE 115 may transmit an indication of the position of the perceived object to one or more receiving UEs 115, where the indicated position is relative to the absolute position of the UE 115.

A receiving UE 115 receiving the SSM may determine the position of the perceived object relative to the position of the receiving UE 115. For example, the receiving UE 115 may determine the position of the perceived object based on the absolute position of the receiving UE 115, the indicated absolute position of the sensing UE 115, and the indicated relative position of the perceived object to the sensing UE 115. For example, if the position of the sensing UE 115 is defined as $(x_1, y_1, z_1)$, the relative position of the perceived object is defined as $(\Delta x, \Delta y, \Delta z)$, and the position of the receiving UE 115 is defined as $(x_2, y_2, z_2)$, the receiving UE 115 may determine the position of the perceived object, relative to the position of the receiving UE 115, by calculating $(x_1, y_1, z_1)+(\Delta x, \Delta y, \Delta z)-(x_2, y_2, z_2)$.

In determining the position of the perceived object relative to the receiving UE 115 based on the absolute position of the receiving UE 115, the absolute position of the sensing UE 115, and the relative position of the perceived object to the absolute position of the sensing UE 115, there are at least three sources of potential measurement error in the calculation: absolute position error associated with determining the absolute position of receiving UE 115, absolute position error associated with determining the absolute position of the sensing UE 115, and sensor error associated with sensing the location of the perceived object relative to the sensing UE 115. For example, the sensing UE 115 may perform two measurements which may include errors (e.g., one absolute position measurement and one relative position measurement), and the receiving UE 115 may perform a measurement which may include an error (e.g., one absolute position measurement).

In some cases, absolute position errors may be large relative to sensor errors. For example, an absolute position determined based on GPS signaling may potentially include errors on the scale of one or more meters, while a relative position determined based on a lidar sensor may potentially include errors on the scale of one or more centimeters (e.g., approximately a factor of 100 smaller than the absolute position errors). In some cases, the error contribution from absolute position errors may negatively impact the ability of the receiving UE 115 to use the shared sensor information from the sensing UE 115 to improve performance. Additionally or alternatively, the error contribution from absolute position errors may negatively impact UE 115 decisions, possibly impacting safety and automated driving at the UEs 115. For example, if a vehicle receives an inaccurate position of an object, the vehicle may determine an incorrect trajectory prediction of one or more objects, which may result in hazards, collisions, or inefficient driving decisions.

The techniques described herein relate to improved methods, systems, devices, or apparatuses that support alternative coordination systems for sensor sharing. Generally, a UE 115 may determine the position of a detected object relative to the position of a common reference point, such as a roadside feature that may be detected by both the UE 115 transmitting an SSM and one or more other UEs 115 receiving the SSM. The UE 115 may transmit an indication of the position of the perceived object relative to the common reference point to the one or more other UEs 115. In some examples, a receiving UE 115 may determine the position of the common reference point relative to the receiving UE 115 and determine the position of the perceived object relative to the receiving UE 115 based on the position of the perceived object relative to the common reference point. In some cases, determining the position of a perceived object based on the relative position of the perceived object to a common reference point may enable communicating the position of a perceived object independent of the absolute positions of one or more UEs 115 (e.g., the UE 115 transmitting the SSM and the UE 115 receiving the SSM). In some cases, communicating the position of a perceived object independent of absolute positions may reduce or otherwise mitigate the error associated with measuring absolute positions, resulting in more accurate communication and determination of an object's position. In some examples, a UE 115 may include the position of an object relative to a reference entity in an SSM in addition or alternative to including the position of the object relative to the absolute position of the UE 115 in the SSM.

Figure 2:
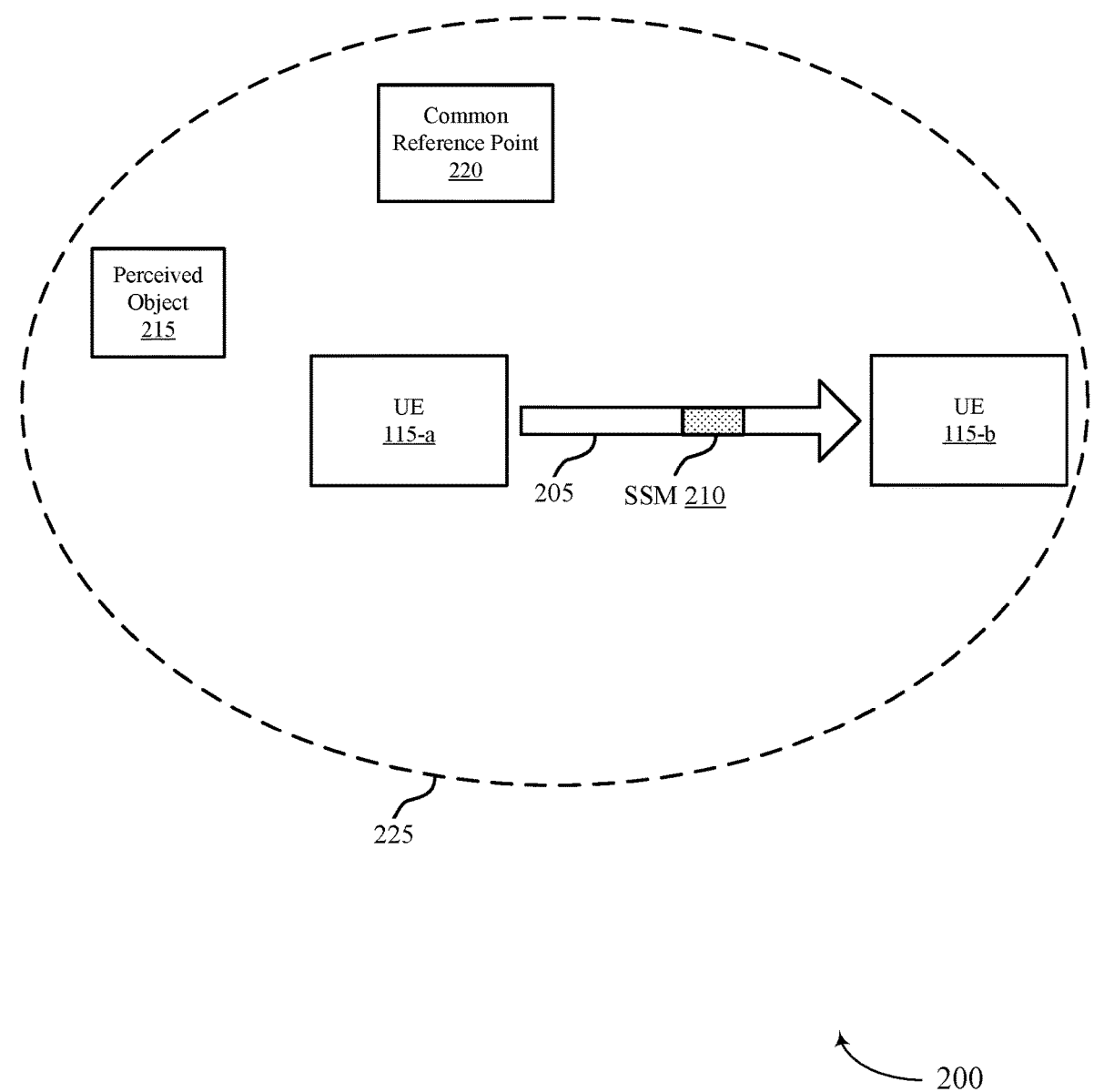

FIG. 2 illustrates an example of a wireless communications system 200 that supports an alternative coordinate system for sensor sharing in accordance with aspects of the present disclosure. In some examples, the wireless communications system 200 may implement aspects of a wireless communications system 100. The wireless communications system 200 may include UE 115-a and UE 115-b, which may be examples of UEs 115 as described with reference to FIG. 1. UE 115-a and UE 115-b may support sensor sharing for vehicle-based communications such as V2X, V2V, and CV2X communications. For example, UE 115-a may share position information for use by UE 115-b.

In the wireless communications system 200, UE 115-a may share sensor information with UE 115-b via a wireless link 205. The wireless link 205 may be an example of a sidelink communication link, a link supporting broadcast transmissions, or a combination thereof. UE 115-a may transmit an SSM 210, containing sensor information, via the wireless link 205 to UE 115-b. Additionally or alternatively, UE 115-a may broadcast the SSM 210 for use by multiple UEs 115 within a sensor sharing range 225. UE 115-a may share, in the SSM 210, the position of a perceived object 215 relative to a common reference point 220.

UE 115-a may identify a perceived object 215 and determine to share the position of the perceived object 215 with UE 115-b (or any other UEs 115 within the sensor sharing range 225 and monitoring for SSMs 210). UE 115-a may select a common reference point 220 to support sharing the position of the perceived object 215. UE 115-a may determine the position of the perceived object 215 relative to the position of the selected common reference point 220. In some cases, UE 115-a may determine the position of the perceived object 215 in a coordinate system based on the position of the common reference point 220. For example, UE 115-a may determine the position of the perceived object 215 in a coordinate system where the common reference point 220 is positioned at the origin, and the position of the perceived object is described as a set of coordinates relative to the origin (e.g., the common reference point 220). In some cases, distance and direction between the perceived object 215 and the common reference point 220 may be referred to as an offset.

UE 115-a may configure an SSM 210 to share the position information of the perceived object 215 with UE 115-b. In some cases, the SSM 210 may include an indication of the common reference point 220 and an indication of the offset between the selected common reference point 220 and the perceived object 215. In some cases, the indication of the common reference point 220 may include the absolute position of the common reference point 220, an object identifier (ID) for the common reference point 220 (e.g., a reference entity corresponding to the common reference point 220). In some cases, the indication of the common reference point 220 may include one or more of the latitude, longitude, or elevation of the common reference point 220. For example, the SSM 210 may include a field including the indication of the common reference point 220, where the field may be referred to as refPosSec (e.g., a reference position field for a second coordinate system) and may contain a Position3D (e.g., the latitude, longitude, and elevation of the common reference point 220). In some cases, the indication of the offset between the selected common reference point 220 and the perceived object 215 may indicate the position of the perceived object 215 relative to the selected common reference point 220 in a field of the SSM 210. In some cases, the indication of the offset between the selected common reference point 220 and the perceived object 215 may be a set of coordinates relative to the position of the common reference point 220. For example, the SSM 210 may include a field including the indication of the offset between the selected common reference point 220 and the perceived object 215, where the field may be referred to as posSec (e.g., a position field for the second coordinate system) and may contain a PositionOffsetLLV (e.g., the latitude, longitude, and elevation of the perceived object 215 relative to the position of the common reference point 220).

Additionally, in some cases, the SSM 210 may be configured to include an indication of the accuracy associated with the indication of the common reference point 220, an indication of the accuracy associated with the indication of the offset between the common reference point 220 and the perceived object 215, or both. In some cases, the indication of the accuracy associated with the indication of the common reference point 220 may provide an indication of the accuracy or error (e.g., potential sensor error) associated with one or more of the latitude, longitude, or elevation of the common reference point 220. For example, the SSM 210 may include a field including the indication of the accuracy associated with the indication of the common reference point 220, where the field may be referred to as accuracySsec (e.g., an accuracy field for the selected reference entity for the second coordinate system) and may contain a DF_PositionConfidenceSet (e.g., the latitude, longitude, and elevation accuracies of the selected reference entity). In some cases, the indication of the accuracy associated with the indication of the offset between the common reference point 220 and the perceived object 215 may provide an indication of accuracy or error (e.g., potential sensor error) associated with the accuracy of the position offset between the perceived object 215 and the common reference point 220. For example, the SSM 210 may include a field including the indication of the accuracy associated with the indication of the offset between the common reference point 220 and the perceived object 215, where the field may be referred to as accuracySec (e.g., an accuracy field for the position offset of the object for the second coordinate system) and may contain a DF_PositionConfidenceSet (e.g., the latitude, longitude, and elevation accuracies of the position offset of the object).

UE 115-$a$ may select a common object that is detectable by both UE 115-$a$ and UE 115-$b$ for use as the common reference point 220. In some examples, the common object may be a roadside feature such as a street lamp, a traffic signal, a stop sign, a speed sign, a tree, a fire hydrant, or any other permanent or semi-permanent feature (e.g., that is not mobile).

In some examples, UE 115-$a$ may select an entity that is obvious and observable for all (or most) UEs 115 within the sensor sharing range 225, such as a traffic signal. For example, UE 115-$a$ may predict or otherwise determine an observability metric for a number of entities observable to UE 115-$a$ (e.g., based on the positions of the entities, obstructions around the entities, a characteristic of the entities, etc.) and may select an entity as the reference entity (e.g., the common reference point 220) based on the predicted observability metrics. For example, UE 115-$a$ may determine one or more predicted observability metrics to inform the selection of a fixed entity to use as the common reference point 220. The predicted observability metric may be related to one or more physical characteristics of a fixed entity and one or more features of the sensor sharing range 225. Additionally or alternatively, one or more predicted observability metrics may be based on one or more SSMs shared by other UEs 115 within the sensor sharing range 225 and received by UE 115-$a$. For example, the predicted observability metric may provide a metric of how many UEs 115 within the sensor sharing range 225 detect a specific fixed entity. Additionally or alternatively, one or more predicted observability metrics may measure whether a specific fixed entity is relatively prominent compared to the surrounding environment.

In some examples, UE 115-$a$ may monitor for one or more other SSMs transmitted by other UEs 115, such as UE 115-$b$ within the sensor sharing range 225, and may select an object as the reference entity (e.g., the common reference point 220) based on the received SSMs. For example, UE 115-$a$ may select a common object that is reported in each of the received SSMs (e.g., in a detected object field of the SSMs, such as detObj). In some cases, UE 115-$a$ may select an object detected by all of the other UEs 115 within the sensor sharing range 225 transmitting SSMs. In some other cases, UE 115-$a$ may determine a set of objects detected in different SSMs and may select an object based on the rate of occurrences of the objects across the SSMs, based on the capabilities of the UEs 115 transmitting the SSMs to use an alternative coordinate system, or both.

In some examples, UE 115-$a$ may select a common object that is marked in the local high-definition (HD) maps of the UEs 115 within the sensor sharing range 225. For example, UE 115-$a$ may receive indicators associated with local HD maps from UEs 115 within the sensor sharing range 225 (e.g., in SSMs or other messages), where the indicators indicate the local HD maps or entities marked in the local HD maps. UE 115-$a$ may select an object as the reference entity (e.g., the common reference point 220) based on the local HD maps of the UEs 115 (e.g., an object marked in all or a majority of the local HD maps indicated to UE 115-$a$).

In some examples, UE 115-$a$ may indicate multiple candidate reference entities to use as the common reference point 220 in a first SSM 210 (or multiple first SSMs 210). UE 115-$a$ may receive an indication of preference for one or more candidates from UE 115-$b$ or multiple UEs 115 (e.g., in one or more additional SSMs or other messages). For example, the response messages (e.g., SSMs, UE capability messages, etc.) may include a field for indicating one or more preferred entities (e.g., ranked order of entities) to use as the common reference point 220 for an alternative coordinate system. UE 115-$a$ may select an object as the reference entity (e.g., the common reference point 220) based on the indicated preference from UE 115-$b$ or from a set of UEs 115. For example, UE 115-$a$ may implement a function or other process to weight preferences (e.g., ranked entities) from multiple UEs 115 and may select a reference entity of the indicated candidate reference entities based on the weighted preferences.

In some examples, UE 115-$a$ may indicate, in a first SSM 210, the capability to share the location of a perceived object 215 via an alternative coordinate system for sensor sharing (e.g., using position information relative to a reference entity). In response to receiving the indication of the capability, UE 115-$b$ may transmit an interest indicator (e.g., indicating that the UE 115-$b$ may use position information relative to a reference entity to determine an object's position), a list of reference entities that may be used as the common reference point 220, or both in a response message (e.g., an SSM, a UE capability message, etc.). UE 115-$a$ may select a reference entity (e.g., the common reference point 220) based on the response message from UE 115-$b$ (e.g., selecting the reference entity from the list of reference entities) for use as the common reference point 220 for transmission of the SSM 210. Additionally or alternatively, UE 115-$b$ may transmit a message (e.g., an SSM, a UE capability message, etc.) indicating a capability to use the alternative coordinate system for determining an object's position, and UE 115-a may select an object to use as the reference entity based on the indicated capability from UE 115-b.

UE 115-a may indicate the selected reference entity in the SSM 210 so that UE 115-b may determine the same reference entity to use for determining the relative position of an object. In some cases, the indication of the reference entity (e.g., the indication of the common reference point 220) may be the position of the common reference point 220. The position of the common reference point 220 may be the absolute location of the common reference point 220 or a relative location of the common reference point 220. In some cases, the absolute location of the common reference point 220 may be known based on a local HD map. In some other cases, the absolute location of the common reference point 220 may be determined based on the relative position of the common reference point 220 to the absolute location of UE 115-a. However, because this indication may be used for UE 115-b to determine the selected reference entity—and not to calculate the position of the perceived object 215—using the absolute location of UE 115-a to indicate the selected reference entity may not negatively affect the accuracy of determining a position of the perceived object 215.

UE 115-b may receive the SSM 210 from UE 115-a and use position information included in the SSM 210 to inform operations, such as driving decisions. UE 115-b may determine the position of perceived object 215 relative to UE 115-b based on the indicated common reference point 220 and the position of the perceived object 215 relative to the common reference point 220. In some cases, the absolute position of the common reference point 220 may be considered an approximate location. In some such cases, UE 115-b may use the approximate location of the common reference point 220 to locate the common reference point 220 using one or more sensors on UE 115-b, and UE 115-b may use the one or more sensors to determine the offset between UE 115-b and the common reference point 220. UE 115-b may use the determined offset between UE 115-b and the common reference point 220 to determine the offset between UE 115-b and the perceived object 215 (e.g., using the indicated position of the perceived object 215 relative to the common reference point 220 in the SSM 210).

Figure 3:
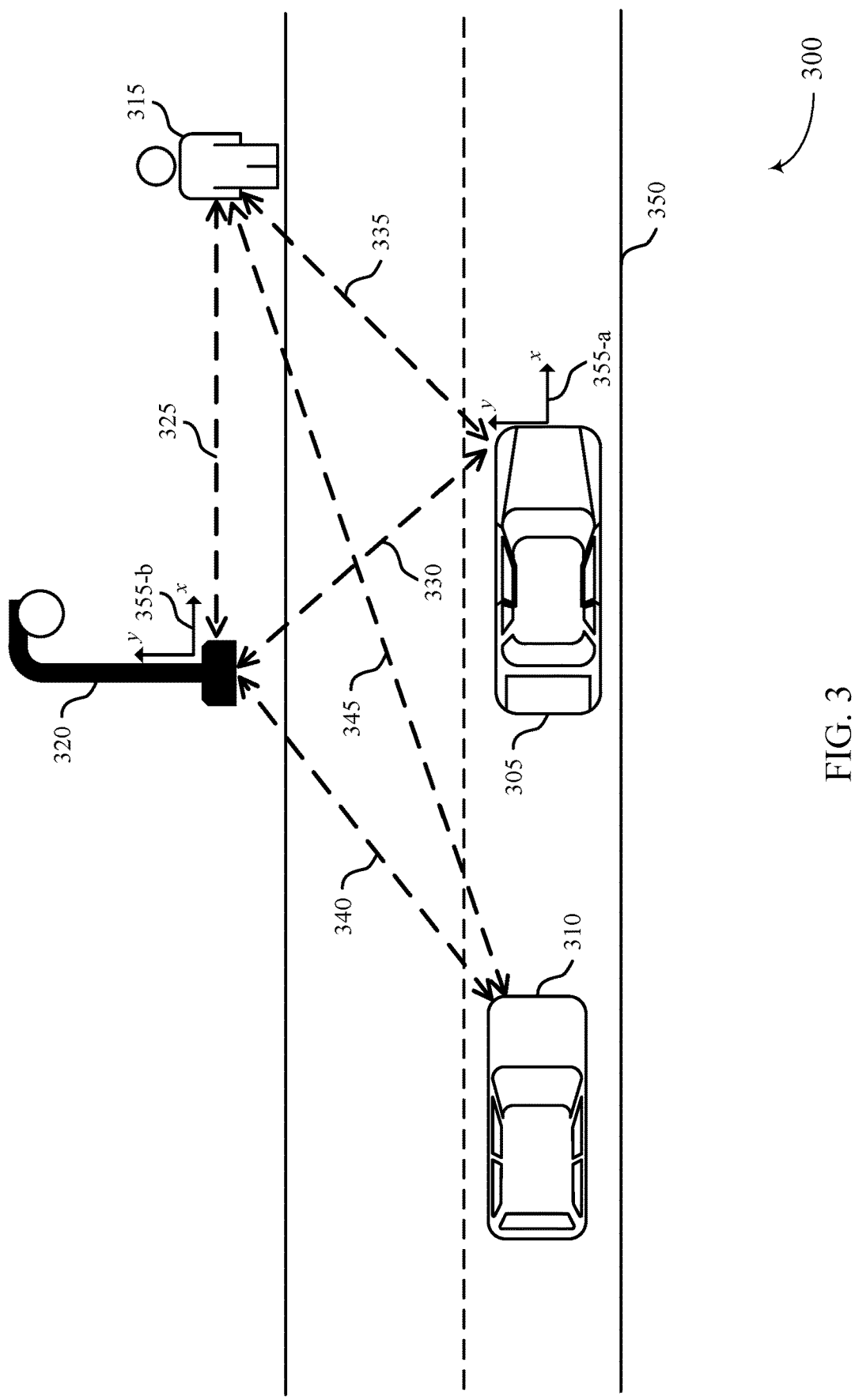

FIG. 3 illustrates an example of a wireless communications system 300 that supports an alternative coordinate system for sensor sharing in accordance with aspects of the present disclosure. In some examples, the wireless communications system 300 may implement aspects of a wireless communications system 100 and a wireless communications system 200. The wireless communications system 300 may include a sensing vehicle 305 and a receiving vehicle 310, which may be examples of UEs 115 as described with reference to FIG. 1 and FIG. 2. The sensing vehicle 305 and the receiving vehicle 310 may be traveling along a road 350.

The sensing vehicle 305 may detect the presence of a VRU 315 (or another object of interest), which may be an example of a perceived object 215, as described with reference to FIG. 2. The sensing vehicle 305 may determine to share the location of the VRU 315 with a receiving vehicle 310. In some cases, the sensing vehicle 305 may determine to share the location of the VRU 315 relative to the position of a common reference point 320 or relative to the absolute position of the sensing vehicle 305 based on the accuracy of the absolute position measurement.

The sensing vehicle 305 may select a fixed entity for use as the common reference point 320. As illustrated in FIG. 3, the sensing vehicle 305 may select a street lamp as the common reference point 320, but the sensing vehicle 305 may select any object detectable by both the sensing vehicle 305 and the receiving vehicle 310 such as a traffic signal, a tree, a fire hydrant, a point on a building, or a similar roadside feature. In some cases, the sensing vehicle 305 may select a fixed entity for use as the common reference point 320 that is obvious and observable to all receiving UEs 115 in the sensor sharing range of the sensing vehicle 305. Additionally or alternatively, the sensing vehicle 305 may select a common object to use as the common reference point 320 based on signaling or an indication from a receiving vehicle 310.

The sensing vehicle 305 may determine the position of the VRU 315 relative to the common reference point 320 by measuring the position of the common reference point 320 to the sensing vehicle 305 (e.g., using one or more sensors) and measuring the position of the VRU 315 relative to the sensing vehicle 305 (e.g., using one or more sensors).

The sensing vehicle 305 may determine the position of the common reference point 320 relative to the sensing vehicle 305, which may be referred to as a reference point-to-sensing vehicle offset 330, by measuring the distance between the sensing vehicle 305 and the common reference point 320 in the x-direction, y-direction, and z-direction with respect to a coordinate system 355-a (e.g., a coordinate system centered on or otherwise using sensing vehicle 305 as the origin). For example, the coordinate system 355-a may be centered on a sensor of the sensing vehicle 305 used to sense the common reference point 320, the VRU 315, or both. The reference point-to-sensing vehicle offset 330 may be expressed as vector $(x_1, y_1, z_1)$, where $x_1$ is the distance between the common reference point 320 and the sensing vehicle 305 in the x-direction, $y_1$ is the distance between the common reference point 320 and the sensing vehicle 305 in the y-direction, and $z_1$ is the distance between the common reference point 320 and the sensing vehicle 305 in the z-direction (e.g., orthogonal to the x-y plane and not illustrated in FIG. 3). The sensing vehicle 305 may also determine the position of the VRU 315 relative to the sensing vehicle 305, which may be referred to as a sensing vehicle-to-VRU offset 335, by measuring the displacement between the sensing vehicle 305 and the VRU 315 in the x-direction, y-direction, and z-direction. The sensing vehicle-to-VRU offset 335 may be expressed as vector $(x_2, y_2, z_2)$, where $x_2$ is the distance between the VRU 315 and the sensing vehicle 305 in the x-direction, $y_2$ is the distance between the VRU 315 and the sensing vehicle 305 in the y-direction, and $z_2$ is the distance between the VRU 315 and the sensing vehicle 305 in the z-direction (e.g., with reference to the coordinate system 355-a).

The sensing vehicle 305 may determine the position of the VRU 315 relative to the position of the selected common reference point 320, which may be referred to as a reference point-to-VRU offset 325, by adding the common reference point-to-sensing vehicle offset 330 and the sensing vehicle-to-VRU offset 335. The reference point-to-VRU offset 325 may be expressed as vector $(\Delta x_1, \Delta y_1, \Delta z_1)$, where $\Delta x_1$ is the distance between the common reference point 320 and the VRU 315 in the x-direction, $\Delta y_1$ is the distance between the common reference point 320 and the VRU 315 in the y-direction, and $\Delta z_1$ is the distance between the common reference point 320 and the VRU 315 in the z-direction. In some examples, the reference point-to-VRU offset 325 may be determined as follows: $(\Delta x_1, \Delta y_1, \Delta z_1) = (x_1, y_1, z_1) + (x_2,$ $y_2$, $z_2$). Such a calculation may convert the position of the VRU 315 from corresponding to a coordinate system 355-*a* based on the sensing vehicle 305 to a coordinate system 355-*b* based on the common reference point 320 (e.g., an alternative coordinate system).

The sensing vehicle 305 may determine the location of the VRU 315 relative to the common reference point 320 based on coordinates, vectors, or both. For example, the sensing vehicle 305 may determine the coordinates of the VRU 315 and the common reference point 320 relative to the sensing vehicle 305. For example, the sensing vehicle 305 may define its location as (0,0,0) (e.g., corresponding to the coordinate system 355-*a*) and may define the coordinates of the VRU 315 and the common reference point 320 based on the distance in the x-direction, y-direction, and z-direction between the sensing vehicle 305 and the VRU 315 and the common reference point 320. The sensing vehicle 305 may determine the coordinates of the VRU 315 as ($x_1$, $y_1$, $z_1$) and the coordinates of the common reference point 320 as ($x_2$, $y_2$, $z_2$). The sensing vehicle 305 may determine the position of the VRU 315 relative to the common reference point 320 by determining the coordinates of the VRU 315 relative to the common reference point 320. In some cases, the sensing vehicle 305 may shift the origin of the coordinate system 355-*a* to define the position of the common reference point 320 as the origin (e.g., corresponding to the coordinate system 355-*b*) and may determine the coordinates of the VRU 315 relative to the common reference point 320. For example, the sensing vehicle 305 may determine the coordinates of the VRU 315 relative to the common reference point 320 by performing a coordinates transformation. For example, the coordinates transformation may be defined as ($x_3$, $y_3$, $z_3$)=($x_1$, $y_1$, $z_1$)−($x_2$, $y_2$, $z_2$), where ($x_3$, $y_3$, $z_3$) is the coordinates of the VRU 315 relative to the common reference point 320, ($x_1$, $y_1$, $z_1$) is the coordinates of the VRU 315 relative to the sensing vehicle 305, and ($x_2$, $y_2$, $z_2$) is the coordinates of the common reference point 320 relative to the sensing vehicle 305.

The sensing vehicle 305 may share an indication of the common reference point 320 and the reference point-to-VRU offset 325 with the receiving vehicle 310 via an SSM. The sensing vehicle 305 may also include an indication of the accuracy of the indication of the common reference point 320 and the reference point-to-VRU offset 325 in the SSM.

The receiving vehicle 310 may determine the position of the VRU 315 relative to the position of the receiving vehicle 310 based on information received from the sensing vehicle 305 in the SSM. For example, the receiving vehicle 310 may determine the position of the VRU 315 relative to the position of the receiving vehicle 310 by determining the positional offset between the receiving vehicle 310 and the common reference point 320, which may be referred to as the reference point-to-receiving vehicle offset 340, and summing the reference point-to-receiving vehicle offset 340 and the reference point-to-VRU offset 325 (e.g., using vectors, coordinates, or both).

The receiving vehicle 310 may receive an indication of the position of the common reference point 320 from the sensing vehicle 305. The receiving vehicle 310 may use the indication of the position of the common reference point 320 to determine the position of the common reference point 320 relative to the receiving vehicle 310, which may be referred to as the reference point-to-receiving vehicle offset 340. The reference point-to-receiving vehicle offset 340 may be expressed as vector ($x_3$, $y_3$, $z_3$), where $x_3$ is the distance between the common reference point 320 and the receiving vehicle 310 in the x-direction, $y_3$ is the distance between the common reference point 320 and the receiving vehicle 310 in the y-direction, and $z_3$ is the distance between the common reference point 320 and the receiving vehicle 310 in the z-direction. The receiving vehicle 310 may determine the reference point-to-receiving vehicle offset 340 using one or more sensors at the receiving vehicle 310 based on the indication of the common reference point 320 in the received SSM. Additionally, the receiving vehicle 310 may determine the reference point-to-VRU offset 325 based on the value indicated in the received SSM and calculated by the sensing vehicle 305.

The receiving vehicle 310 may determine the position of the VRU 315 relative to the position of the receiving vehicle 310, which may be referred to as the receiving vehicle-to-VRU offset 345, by summing the reference point-to-receiving vehicle offset 340 and the reference point-to-VRU offset 325 (e.g., using vectors, coordinates, or both). The receiving vehicle-to-VRU offset 345 may be expressed as vector ($\Delta x_2$, $\Delta y_2$, $\Delta z_2$), where $\Delta x_2$ is the distance between the receiving vehicle 310 and the VRU 315 in the x-direction, $\Delta y_2$ is the distance between the receiving vehicle 310 and the VRU 315 in the y-direction, and $\Delta z_2$ is the distance between the receiving vehicle 310 and the VRU 315 in the z-direction. In some examples, the receiving vehicle-to-VRU offset 345 may be determined as follows: ($\Delta x_2$, $\Delta y_2$, $\Delta z_2$)=($x_3$, $y_3$, $z_3$)+($\Delta x_1$, $\Delta y_1$, $\Delta z_1$). Accordingly, without detecting the VRU 315 using one or more sensors, the receiving vehicle 310 may determine the position of the VRU 315 based on the received SSM and the common reference point 320. The receiving vehicle 310 may use this information to assist in automated driving operations (e.g., in order to avoid a collision with the VRU 315) or other operations or messaging.

In some examples, the SSM may include positioning information for an object (e.g., the VRU 315) using a primary coordinate system (e.g., relative to the absolute position of the sensing vehicle 305), a secondary coordinate system (e.g., relative to the common reference point 320 as described herein), or both. For example, the SSM may include fields to define positions, accuracies, or both for both of the coordinate systems. The sensing vehicle 305 may leave one or more fields empty (or include default values) if using one coordinate system. Alternatively, the sensing vehicle 305 may include position information for both coordinate systems. The receiving vehicle 310 may use the position information for one or both coordinate systems. For example, the receiving vehicle 310 may determine whether to use the primary coordinate system or the secondary coordinate system based on accuracy metrics for the primary coordinate system, the secondary coordinate system, or both, based on a capability of the receiving vehicle 310 to use the secondary coordinate system, based on an ability of the receiving vehicle 310 to detect the common reference point 320, or based on some combination thereof. Alternatively, the receiving vehicle 310 may use both the primary coordinate system and the secondary coordinate system to determine a position of the VRU 315.

Figure 4:
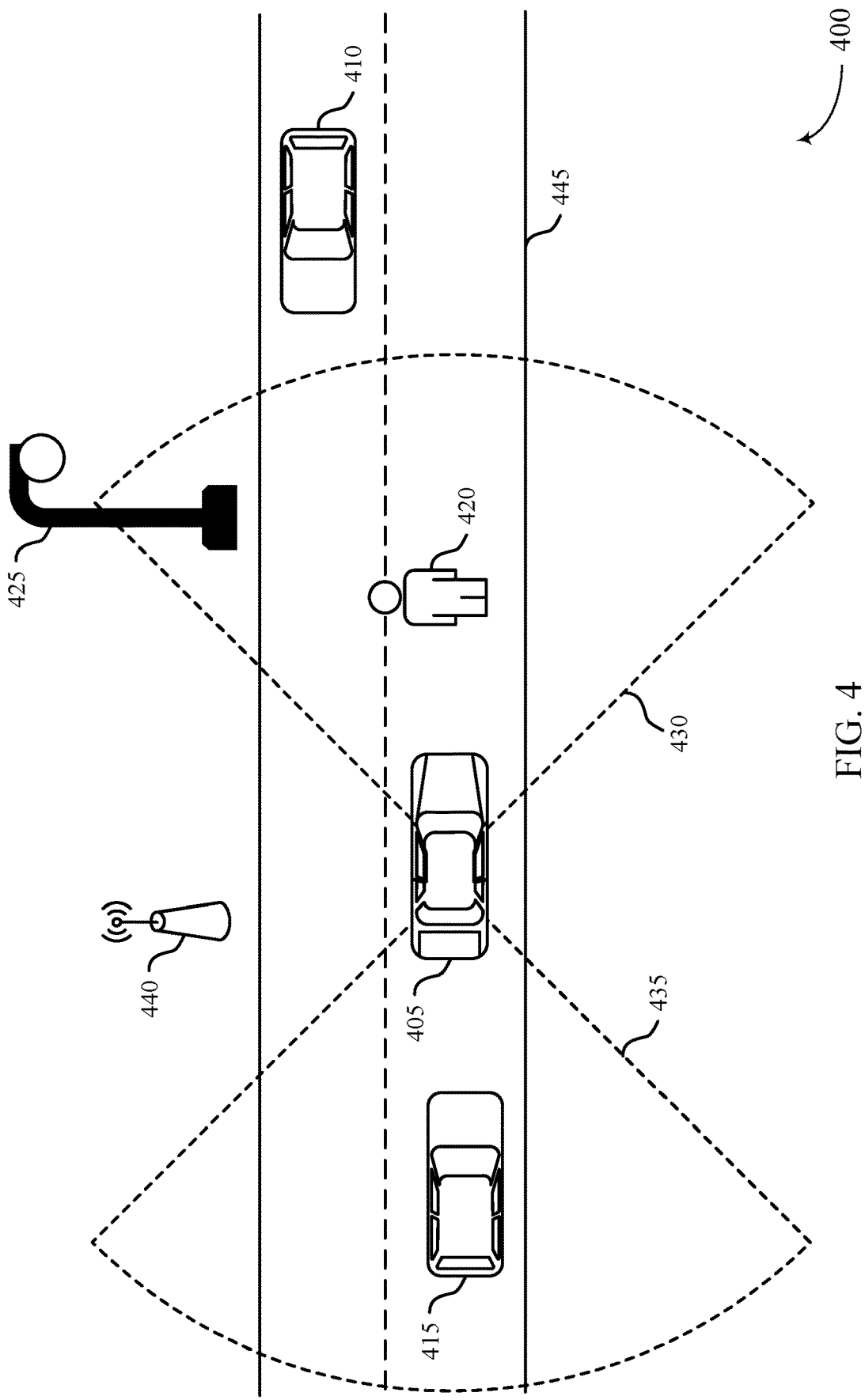

FIG. 4 illustrates an example of a wireless communications system 400 that supports an alternative coordinate system for sensor sharing in accordance with aspects of the present disclosure. In some examples, the wireless communications system 400 may implement aspects of a wireless communications system 100, a wireless communications system 200, a wireless communications system 300, or a combination thereof. The wireless communications system 400 may include a sensing vehicle 405, a connected vehicle 410, and a non-connected vehicle 415, which may be examples of UEs 115 as described with reference to FIGS. 1 through 3. The sensing vehicle 405, the connected vehicle 410, and the non-connected vehicle 415 may be traveling along a road 445.

The sensing vehicle 405 may detect the presence of a VRU 420 (or another object) and a non-connected vehicle 415. The non-connected vehicle 415 may be an example of a vehicle that does not support V2X communications. The sensing vehicle 405 may determine to broadcast position information about the VRU 420 and the non-connected vehicle 415 for possible use by other UEs 115 within the sensor sharing range of the sensing vehicle 405, such as a connected vehicle 410.

The sensing vehicle 405 may broadcast position information about the VRU 420 and the non-connected vehicle 415 in an SSM, which may be an example of an SSM 210 as described with reference to FIG. 2. In some examples, the sensing vehicle 405 may broadcast position information in one or more coordinate systems. For example, the sensing vehicle 405 may provide information about the position of the VRU 420 and the non-connected vehicle 415 in a coordinate system relative to the absolute position of the sensing vehicle 405, in a coordinate system relative to the position of a common reference point 425, or both in the same SSM.

In some cases, two or more objects may be observed by different sensors on the sensing vehicle 405. For example, the VRU 420 and the common reference point 425 may be detected by a first sensor due to the VRU 420 and the common reference point 425 being observed in a first sensor range 430, and the non-connected vehicle 415 may be detected by a second sensor, due to the non-connected vehicle 415 being observed in a second sensor range 435. In some cases, based on the sensing vehicle 405 sensing the location of the VRU 420 and the common reference point 425 using the same sensor, the sensing vehicle 405 may support calculating a relative position of the VRU 420 relative to the common reference point 425. In some cases, the sensing vehicle 405 may perform additional transformations on position information to relate the position of objects observed by different sensors. For example, the sensing vehicle 405 may perform the additional transformations such that the position of an object detected by a sensor other than the sensor used to detect the common reference point 425 may be broadcast in the coordinate system relative to the location of the common reference point 425. In some other cases, the sensing vehicle 405 may determine not to calculate the relative locations of objects detected by different sensors on the sensing vehicle 405. For example, the sensing vehicle 405 may refrain from calculating a relative position of the non-connected vehicle 415 relative to the common reference point 425 based on detecting the non-connected vehicle 415 and the common reference point 425 using different sensors. In some cases, the determination to broadcast or to not broadcast the relative position of objects observed by different sensors on the sensing vehicle 405 may be based on one or more error thresholds associated with the position measurements, the transformation, or both.

In some cases, the wireless communications system 400 may include a roadside unit (RSU), such as an RSU 440. The RSU 440 may assist in determining a reference point or fixed entity to be used as the common reference point 425 for the sharing of position information by a sensing vehicle 405. In some cases, the RSU 440 may broadcast an indication of a preferable fixed entity to use as the common reference point 425 for the alternate coordinate system, and this indication may include the absolute location of the common reference point 425. In some examples, the sensing vehicle 405, the connected vehicle 410, or both may use the indication of the absolute location of the common reference point 425 to determine the location of one or more observed objects and inform driving decisions.

In some cases, the RSU 440 may be used to determine the absolute location of a common reference point 425 determined by a sensing vehicle 405. An RSU 440 may contain relatively accurate absolute position information about objects near the RSU 440. In some cases, the RSU 440 may receive an SSM from the sensing vehicle 405 containing position information about a common reference point 420. The RSU 440 may determine more accurate absolute position information for the indicated common reference point 425, and the RSU 440 may broadcast the more accurate absolute position information for use by the sensing vehicle 405, the connected vehicle 410, or both.

In some cases, the sensing vehicle 405 may use the RSU 440 as the common reference point 425 for sharing position information associated with the VRU 420. In some cases, the absolute position of the RSU 440 may be known to all UEs 115 within a wireless communications system 400. Additionally or alternatively, the position of the RSU 440 may be used to offset absolute position error associated with determining the absolute position of the common reference point 425.

Figure 5:
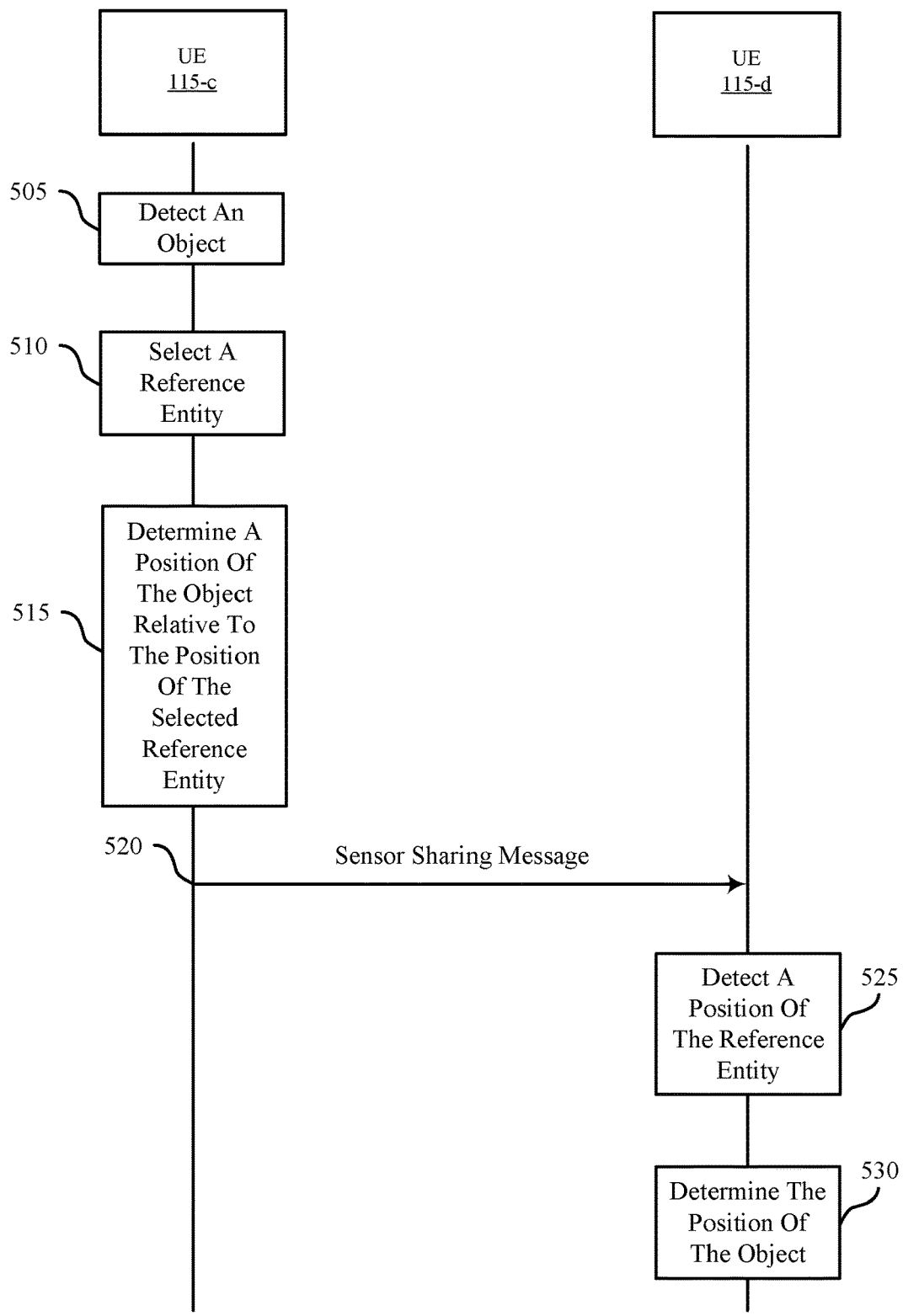
FIG. 5 illustrates an example of a process flow that supports an alternative coordinate system for sensor sharing in accordance with aspects of the present disclosure.

FIG. 5 illustrates an example of a process flow 500 that supports an alternative coordinate system for sensor sharing in accordance with aspects of the present disclosure. In some examples, the process flow 500 may implement aspects of a wireless communication system 100, a wireless communications system 200, a wireless communications system 300, a wireless communications system 400, or a combination thereof. The process flow 500 may be implemented by UE 115-c and UE 115-d to share sensor information to improve UE decision making and performance.

In the following description of the process flow 500, the operations between UE 115-c and UE 115-d may be transmitted in a different order than the example order shown, or the operations performed by UE 115-c and UE 115-d may be performed in different orders or at different times. Some operations may also be omitted from the process flow 500, and other operations may be added to the process flow 500. UE 115-c and UE 115-d may be examples of UEs 115, vehicles, or both as described with reference to FIGS. 1 through 4.

At 505, UE 115-c may detect an object. The object may be an object within the sensor range of UE 115-c. UE 115-c may detect the object with one or more of lidar, radar, cameras, or ultrasound. The object may be a stationary or mobile object that may be on the road, near the road, or above the road. The object may be any object such as a VRU, wildlife, a non-connected vehicle, road debris, or any other such object. UE 115-c may determine to share the location of the detected object with UE 115-d.

At 510, UE 115-c may select a reference entity detectable by UE 115-d. In some cases, the selection of the reference entity may include selecting the reference entity based on a predicted observability metric associated with the reference entity. Additionally or alternatively, the selection of the reference entity may include receiving, from UE 115-d, one or more SSMs that include a list of detected entities and selecting the reference entity from the set of candidate entities from the list of detected entities. Additionally or alternatively, the selection of the reference entity may include receiving, from UE 115-d, one or more indicators associated with local HD maps for UEs 115, such as UE 115-*d*, and selecting the reference entity from a set of candidate entities marked in each local HD map of the respective local HD maps for multiple UEs 115 based on the one or more indicators.

At 515, UE 115-*c* may determine the position of the object relative to the selected reference entity. In some cases, UE 115-*c* may determine the position of the object relative to the selected reference entity by determining the position of the object relative to UE 115-*c*, determining the position of the selected reference entity relative to UE 115-*c*, and calculating the position of the object relative to the selected reference entity based on the relative locations to UE 115-*c*.

At 520, UE 115-*c* may transmit, to UE 115-*d*, an SSM including the position of the object relative to the selected reference entity and an indication of the selected reference entity. In some examples, the SSM may also include an indication of an accuracy level for the position of the object. In some examples, the indication of the selected reference entity may include a position of the selected reference entity relative to UE 115-*c*.

At 525, UE 115-*d* may detect the position of the reference entity relative to the location of UE 115-*d*. In some cases, UE 115-*d* may detect the selected reference entity using a sensor equipped to UE 115-*d*. The sensor may include a lidar sensor, a radar sensor, a camera-based sensor, a long range scanning sensor, a forward-mounted object detection sensor, a mid-range blind spot detection sensor, a long-range lane change assist sensor, or any combination thereof.

At 530, UE 115-*d* may determine the position of the object relative to UE 115-*d* based on the position of the object relative to the position of the selected reference entity and the detected position of the selected reference entity. In this way, UE 115-*d* may determine the position of the object independent of an absolute position of UE 115-*c* and an absolute position of UE 115-*d*.

Accordingly, the error associated with the determined position of the object may be based on three sensor measurements (e.g., the position of the reference entity relative to UE 115-*c*, the position of the object relative to UE 115-*c*, and the position of the reference entity relative to UE 115-*d*). Because sensor measurement error may be significantly smaller than absolute positioning measurement error, the error associated with the position of the object determined in this way may be significantly smaller than the error associated with determining the position of the object relative to UE 115-*c*. For example, the error associated with determining the position of the object relative to UE 115-*c* may be based on one sensor measurement and two absolute positioning measurements (e.g., the absolute position of UE 115-*c*, the position of the object relative to UE 115-*c*, and the absolute position of UE 115-*d*). Accordingly, using the alternative coordinate system for sensor sharing based on the reference entity may improve the accuracy of communicated object positioning.

Figure 6:
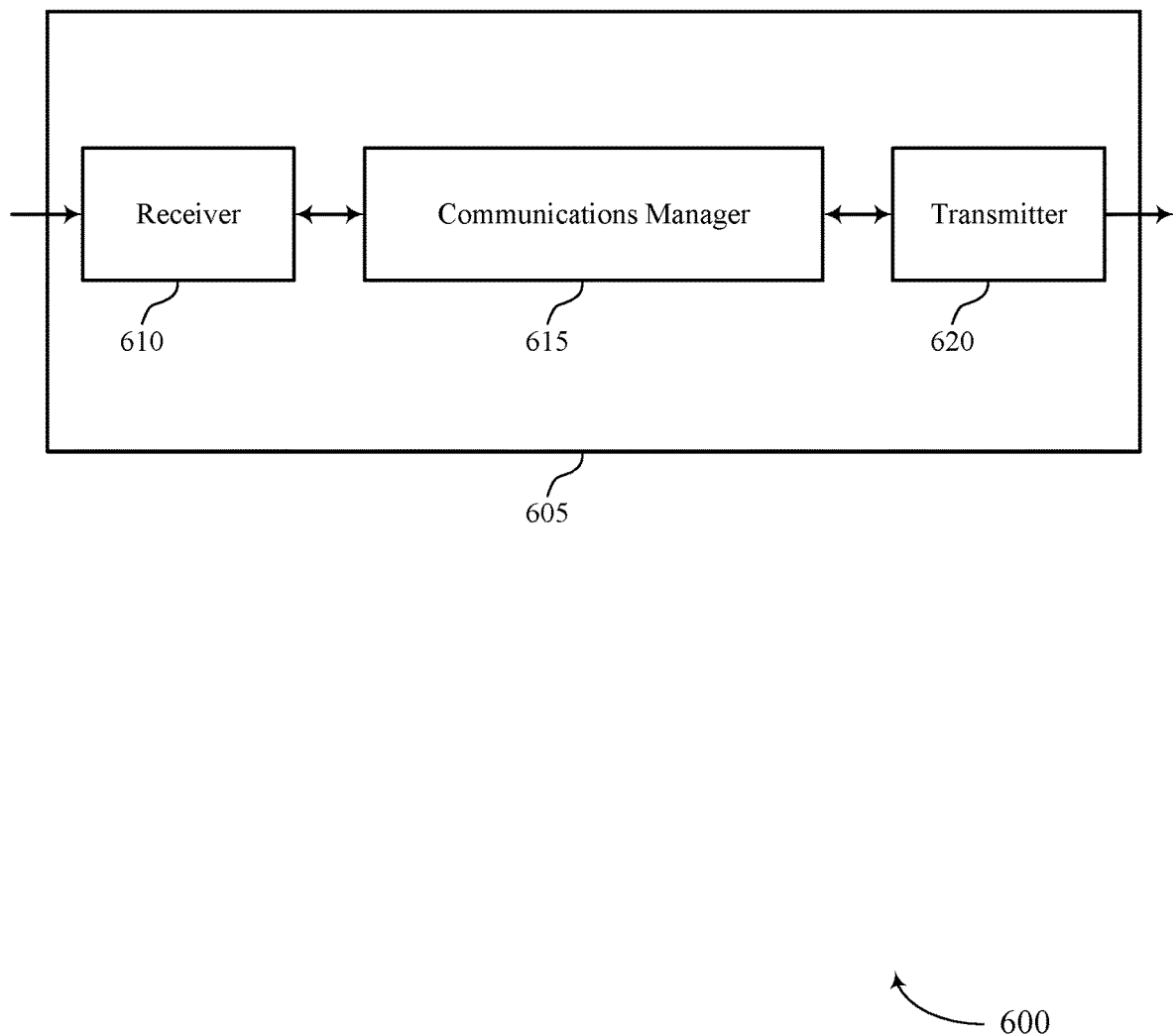
FIGS. 6 and 7 show block diagrams of devices that support an alternative coordinate system for sensor sharing in accordance with aspects of the present disclosure.

FIG. 6 shows a block diagram 600 of a device 605 that supports an alternative coordinate system for sensor sharing in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information channels related to an alternative coordinate system for sensor sharing, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may be an example of a first UE. In some examples, the communications manager 615 may detect an object, select a reference entity detectable by a second UE, determine a position of the object relative to the selected reference entity, and transmit, to the second UE, an SSM including the position of the object relative to the selected reference entity and an indication of the selected reference entity. Additionally or alternatively, the communications manager 615 may receive, from a second UE, an SSM including an indication of a selected reference entity and a first position of an object relative to the selected reference entity, detect a second position of the selected reference entity relative to the first UE, and determine a third position of the object relative to the first UE based on the first position of the object and the second position of the selected reference entity. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands. Additionally or alternatively, the communications manager 615 may be implemented as a component of a vehicle supporting V2X communications.

The communications manager 615 as described herein may be implemented to realize one or more potential advantages. One implementation may allow the device 605 to share the position of a perceived object relative to the position of a reference entity with one or more other UEs within the network. Based on the techniques for sharing the position information of the perceived object, the device 605 may support more accurate communication of the location of the perceived object to the other UEs. For example, by indicating the position of the object via an alternative coordinate system relative to a reference object (e.g., as opposed to relative to an absolute position of the device 605), the device 605 may reduce the potential error associated with the communicated position.

As such, the device 605 may increase the likelihood of accurately communicating the position of a perceived object to one or more other UEs and, according, may improve the quality of information provided for UE decision making, such as driving decisions. In some examples, based on the greater likelihood of more accurate position information, the device 605 may improve user experience and improve safety of vehicle operation associated with V2X communications.

Figure 7:
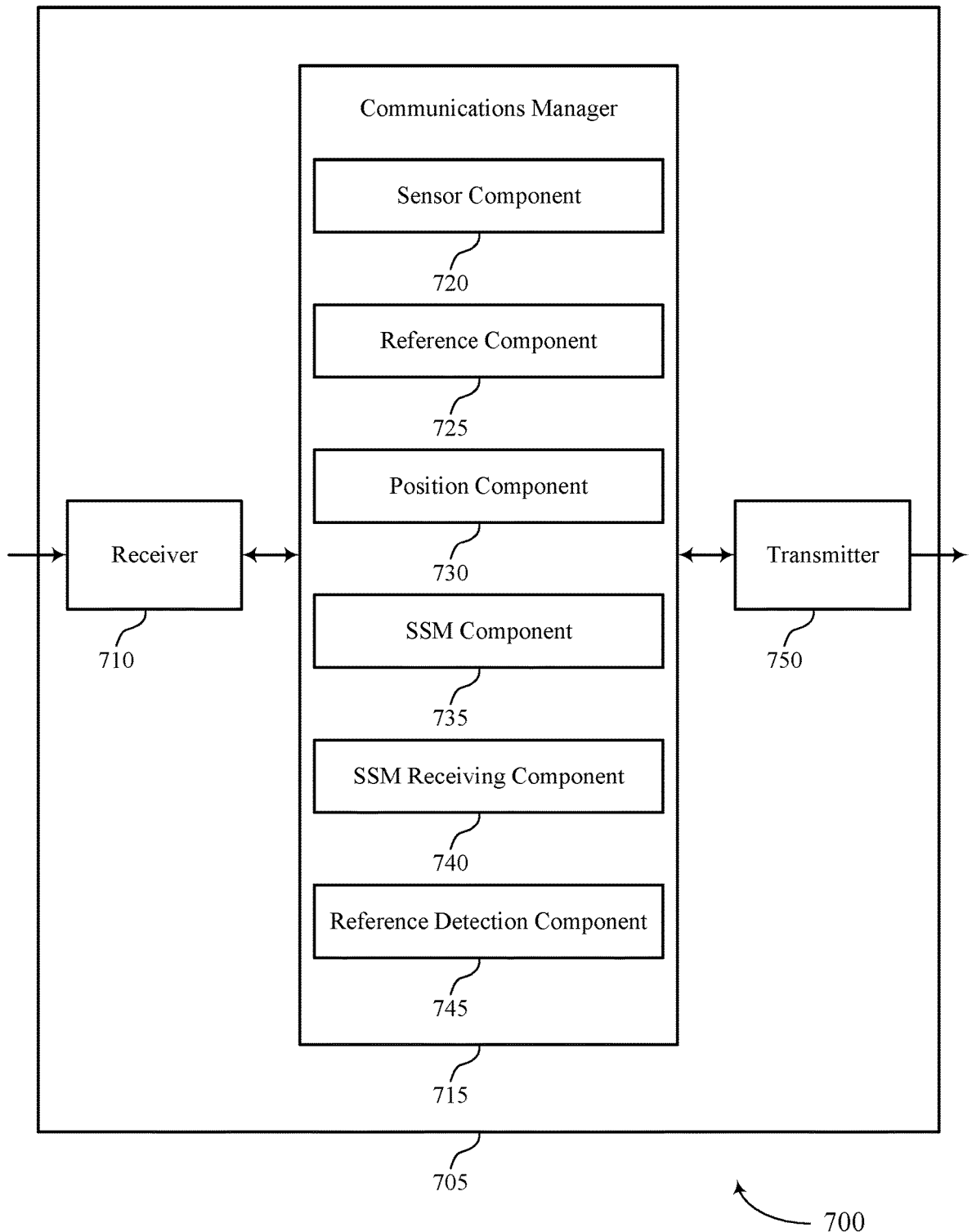

FIG. 7 shows a block diagram 700 of a device 705 that supports an alternative coordinate system for sensor sharing in accordance with aspects of the present disclosure. The device 705 may be an example of aspects of a device 605 or a UE 115 as described herein. The device 705 may include a receiver 710, a communications manager 715, and a transmitter 750. The device 705 may also include a processor. Each of these components may be in communication with one another (e.g., via one or more buses).

The receiver 710 may receive information such as packets, user data, or control information associated with various information channels (e.g., control channels, data channels, and information channels related to an alternative coordinate system for sensor sharing, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a sensor component 720, a reference component 725, a position component 730, an SSM component 735, an SSM receiving component 740, a reference detection component 745, or any combination thereof. The communications manager 715 may be an example of aspects of the communications manager 910 described herein.

The communications manager 715 may be implemented at a first UE. The sensor component 720 may detect an object. The reference component 725 may select a reference entity detectable by a second UE. The position component 730 may determine a position of the object relative to the selected reference entity. The SSM component 735 may transmit, to the second UE, an SSM including the position of the object relative to the selected reference entity and an indication of the selected reference entity.

Additionally or alternatively, the SSM receiving component 740 may receive, from a second UE, an SSM including an indication of a selected reference entity and a first position of an object relative to the selected reference entity. The reference detection component 745 may detect a second position of the selected reference entity relative to the first UE. The position component 730 may determine a third position of the object relative to the first UE based on the first position of the object and the second position of the selected reference entity.

The transmitter 750 may transmit signals generated by other components of the device 705. In some examples, the transmitter 750 may be collocated with a receiver 710 in a transceiver module. For example, the transmitter 750 may be an example of aspects of the transceiver 920 described with reference to FIG. 9. The transmitter 750 may utilize a single antenna or a set of antennas.

Figure 8:
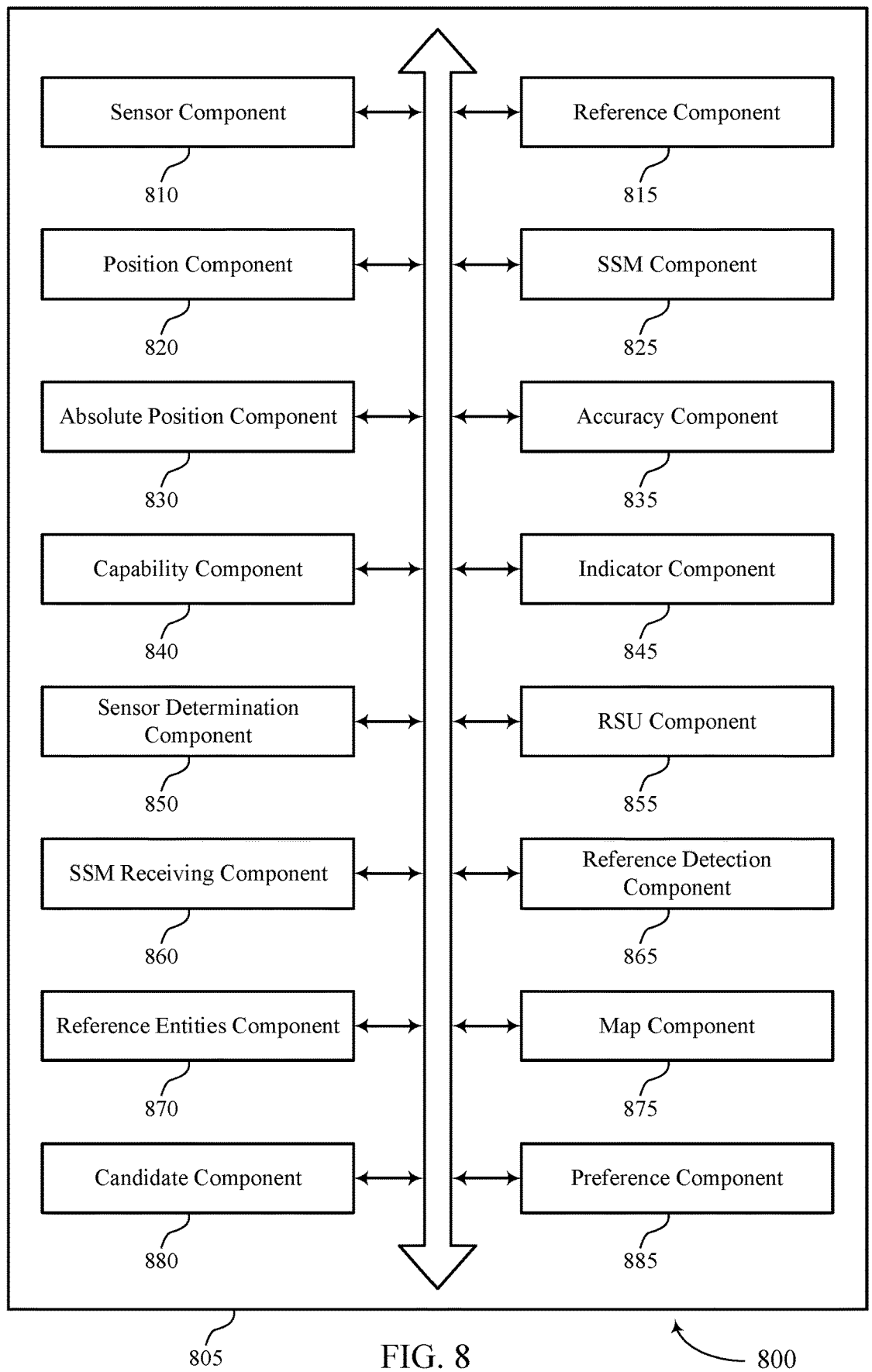
FIG. 8 shows a block diagram of a communications manager that supports an alternative coordinate system for sensor sharing in accordance with aspects of the present disclosure.

FIG. 8 shows a block diagram 800 of a communications manager 805 that supports an alternative coordinate system for sensor sharing in accordance with aspects of the present disclosure. The communications manager 805 may be an example of aspects of a communications manager 615, a communications manager 715, or a communications manager 910 described herein. The communications manager 805 may include a sensor component 810, a reference component 815, a position component 820, an SSM component 825, an absolute position component 830, an accuracy component 835, a capability component 840, an indicator component 845, a sensor determination component 850, an RSU component 855, an SSM receiving component 860, a reference detection component 865, a reference entities component 870, a map component 875, a candidate component 880, a preference component 885, or any combination of these or other components. Each of these components may communicate, directly or indirectly, with one another (e.g., via one or more buses). The communications manager 805 may be implemented at a first UE.

The sensor component 810 may detect an object, and the reference component 815 may select a reference entity detectable by a second UE. In some cases, the object may be an example of a VRU, a vehicle, an obstacle, or a combination thereof, and the selected reference entity may correspond to a fixed position. The position component 820 may determine a position of the object relative to the selected reference entity. The SSM component 825 may transmit, to the second UE, an SSM including the position of the object relative to the selected reference entity and an indication of the selected reference entity.

In some examples, the position component 820 may determine a first position of the object relative to the first UE, determine a second position of the selected reference entity relative to the first UE, and calculate the position of the object relative to the selected reference entity based on the first position and the second position.

In some cases, the position of the object relative to the selected reference entity includes a first position of the object, and the SSM further includes a second position of the object relative to the first UE and an absolute position of the first UE. The absolute position component 830 may determine the absolute position of the first UE using a positioning system, where the positioning system includes a GPS, a GNSS, or both. The accuracy component 835 may determine an accuracy level for the absolute position of the first UE based on a positioning system for the first UE, the SSM further including an indication of the accuracy level for the absolute position of the first UE. In some cases, the SSM further includes an indication of an accuracy level for the position of the object.

In some cases, the indication of the selected reference entity includes a position of the selected reference entity relative to the first UE. In some such cases, the SSM further includes an indication of an accuracy level for the position of the selected reference entity.

In some examples, the reference component 815 may select the reference entity based on a predicted observability metric associated with the reference entity.

In some examples, the reference component 815 may receive, from a set of UEs, a set of SSMs including respective lists of detected entities, and the reference component 815 may select the reference entity from a set of candidate entities common to the respective lists of detected entities for the set of SSMs.

In some examples, the reference component 815 may receive, from a set of UEs, a set of indicators associated with respective local HD maps for the set of UEs, and the reference component 815 may select the reference entity from a set of candidate entities marked in each local HD map of the respective local HD maps for the set of UEs based on the set of indicators.

In some examples, the reference component 815 may transmit, to the second UE, a first SSM indicating a set of candidate entities, where the SSM is an example of a second SSM. In some such examples, the reference component 815 may receive, from the second UE, a response message indicating a preferred entity of the set of candidate entities, and the reference component 815 may select the reference entity based on the preferred entity.

The capability component 840 may transmit, to the second UE, a first SSM indicating a capability of the first UE to transmit the position of the object relative to the selected reference entity, where the SSM is an example of a second SSM. The indicator component 845 may receive, from the second UE and in response to the first SSM, a response message including an interest indicator for receiving the position of the object relative to the selected reference entity, where the second SSM includes the position of the object relative to the selected reference entity based on the interest indicator. In some examples, the response message further includes a set of candidate entities selected by the second UE, and the indicator component 845 may select the reference entity based on the set of candidate entities.

In some cases, the object may be detected using a sensor equipped to the first UE. The sensor may be an example of a laser incident detection and ranging sensor, a radar sensor, a camera-based sensor, a long range scanning sensor, a forward-mounted object detection sensor, a mid-range blind spot detection sensor, a long-range lane change assist sensor, or any combination thereof. In some examples, the sensor component 810 may detect the reference entity using the sensor. The sensor determination component 850 may determine to transmit the position of the object relative to the selected reference entity in the SSM based on detecting both the object and the reference entity using a same sensor.

The RSU component 855 may receive, from an RSU, an absolute position of the selected reference entity, where the position of the object relative to the selected reference entity is determined based on the absolute position of the selected reference entity.

Additionally or alternatively, the SSM receiving component 860 may receive, from a second UE, an SSM including an indication of a selected reference entity and a first position of an object relative to the selected reference entity. In some cases, the selected reference entity may correspond to a fixed position, and the object may be an example of a VRU, a vehicle, an obstacle, or a combination thereof.

The reference detection component 865 may detect a second position of the selected reference entity relative to the first UE. The position component 820 may determine a third position of the object relative to the first UE based on the first position of the object and the second position of the selected reference entity.

In some cases, the SSM further includes a fourth position of the object relative to the second UE and an absolute position of the second UE. In some such cases, the SSM may further include an indication of an accuracy level for the absolute position of the second UE, and the accuracy component 835 may determine to use the first position of the object to determine the third position of the object relative to the first UE based on the accuracy level for the first position of the object satisfying a threshold value.

In some examples, the SSM further includes an indication of an accuracy level for the first position of the object relative to the selected reference entity, and the accuracy component 835 may determine to use the first position of the object to determine the third position of the object relative to the first UE based on the accuracy level for the absolute position of the second UE satisfying a threshold value.

In some cases, the indication of the selected reference entity includes a fourth position of the selected reference entity relative to the second UE, and the second position of the selected reference entity relative to the first UE is detected based on the fourth position of the selected reference entity relative to the second UE.

The reference entities component 870 may transmit, to the second UE, a first SSM including a list of detected entities, where the SSM may be an example of a second SSM and the selected reference entity is selected from the list of detected entities.

The map component 875 may transmit, to the second UE, an indicator associated with a local HD map, where the selected reference entity is selected from a set of candidate entities marked in the local HD map.

The candidate component 880 may receive, from the second UE, a first SSM indicating a set of candidate entities, where the SSM is an example of a second SSM. The preference component 885 may transmit, to the second UE, a response message indicating a preferred entity of the set of candidate entities, where the selected reference entity is based on the preferred entity.

In some examples, the capability component 840 may receive, from the second UE, a first SSM indicating a capability of the first UE to transmit the first position of the object relative to the selected reference entity, where the SSM is an example of a second SSM. In some such examples, the indicator component 845 may transmit, to the second UE, a response message including an interest indicator for receiving the first position of the object relative to the selected reference entity, where the second SSM includes the first position of the object relative to the selected reference entity based on the interest indicator. In some examples, the candidate component 880 may select a set of candidate entities, where the response message further includes the set of candidate entities and the selected reference entity is based on the set of candidate entities.

In some examples, the sensor component 810 may detect the selected reference entity using a sensor equipped to the first UE. The sensor may be an example of a laser incident detection and ranging sensor, a radar sensor, a camera-based sensor, a long range scanning sensor, a forward-mounted object detection sensor, a mid-range blind spot detection sensor, a long-range lane change assist sensor, or any combination thereof.

Figure 9:
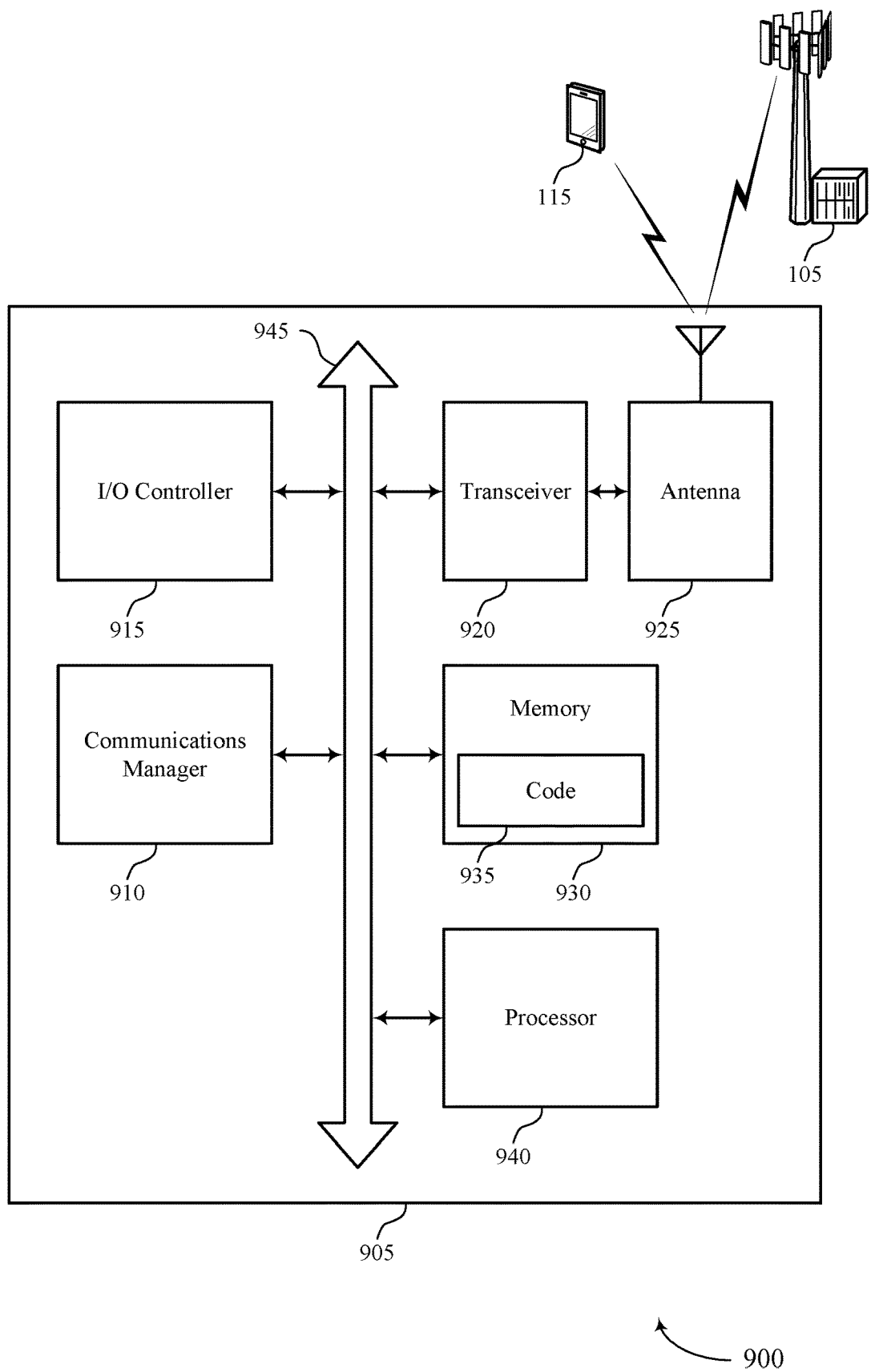
FIG. 9 shows a diagram of a system including a device that supports an alternative coordinate system for sensor sharing in accordance with aspects of the present disclosure.

FIG. 9 shows a diagram of a system 900 including a device 905 that supports an alternative coordinate system for sensor sharing in accordance with aspects of the present disclosure. The device 905 may be an example of or include the components of a device 605, a device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may be implemented at a first UE. The communications manager 910 may detect an object, select a reference entity detectable by a second UE, determine a position of the object relative to the selected reference entity, and transmit, to the second UE, an SSM including the position of the object relative to the selected reference entity and an indication of the selected reference entity. Additionally or alternatively, the communications manager 910 may receive, from a second UE, an SSM including an indication of a selected reference entity and a first position of an object relative to the selected reference entity, detect a second position of the selected reference entity relative to the first UE, and determine a third position of the object relative to the first UE based on the first position of the object and the second position of the selected reference entity.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting an alternative coordinate system for sensor sharing).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
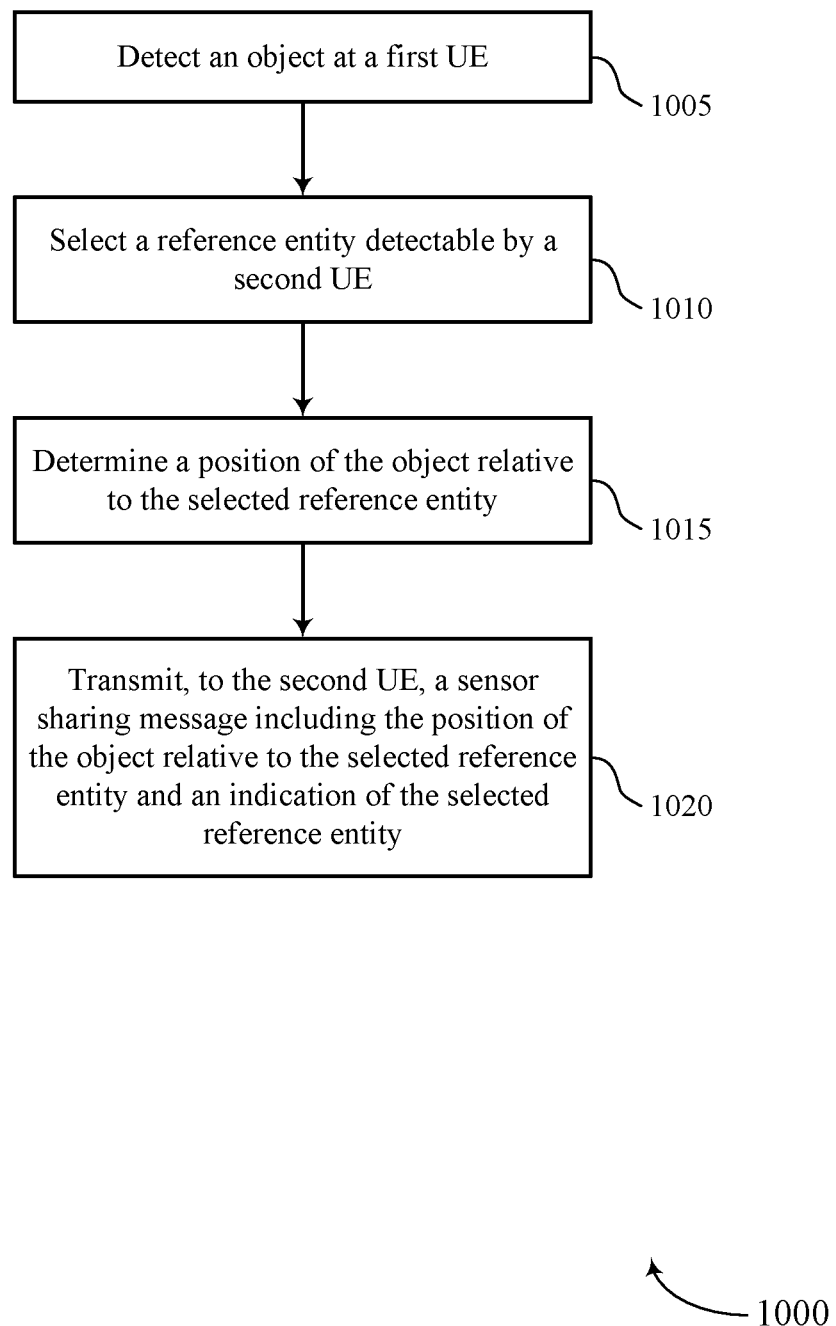
FIGS. 10 through 13 show flowcharts illustrating methods that support an alternative coordinate system for sensor sharing in accordance with aspects of the present disclosure.

FIG. 10 shows a flowchart illustrating a method 1000 that supports an alternative coordinate system for sensor sharing in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE (e.g., a first UE) may detect an object. The operations of 1005 may be performed according to the methods described herein. In some examples, aspects of the operations of 1005 may be performed by a sensor component as described with reference to FIGS. 6 through 9.

At 1010, the UE may select a reference entity detectable by a second UE. The operations of 1010 may be performed according to the methods described herein. In some examples, aspects of the operations of 1010 may be performed by a reference component as described with reference to FIGS. 6 through 9.

At 1015, the UE may determine a position of the object relative to the selected reference entity. The operations of 1015 may be performed according to the methods described herein. In some examples, aspects of the operations of 1015 may be performed by a position component as described with reference to FIGS. 6 through 9.

At 1020, the UE may transmit, to the second UE, an SSM including the position of the object relative to the selected reference entity and an indication of the selected reference entity. The operations of 1020 may be performed according to the methods described herein. In some examples, aspects of the operations of 1020 may be performed by an SSM component as described with reference to FIGS. 6 through 9.

Figure 11:
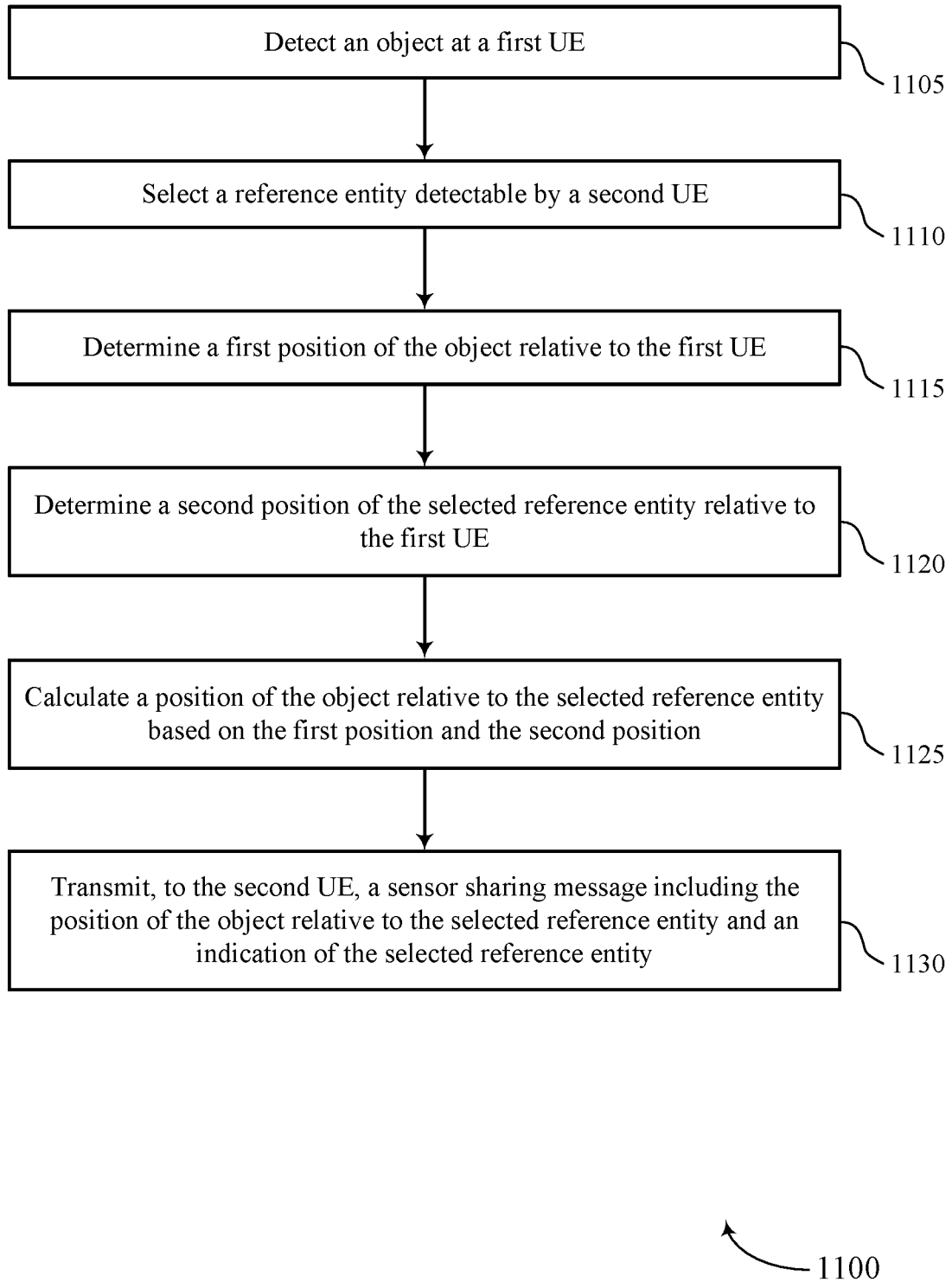

FIG. 11 shows a flowchart illustrating a method 1100 that supports an alternative coordinate system for sensor sharing in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE (e.g., a first UE) may detect an object. The operations of 1105 may be performed according to the methods described herein. In some examples, aspects of the operations of 1105 may be performed by a sensor component as described with reference to FIGS. 6 through 9.

At 1110, the UE may select a reference entity detectable by a second UE. The operations of 1110 may be performed according to the methods described herein. In some examples, aspects of the operations of 1110 may be performed by a reference component as described with reference to FIGS. 6 through 9.

At 1115, the UE may determine a first position of the object relative to the first UE. The operations of 1115 may be performed according to the methods described herein. In some examples, aspects of the operations of 1115 may be performed by a position component as described with reference to FIGS. 6 through 9.

At 1120, the UE may determine a second position of the selected reference entity relative to the first UE. The operations of 1120 may be performed according to the methods described herein. In some examples, aspects of the operations of 1120 may be performed by a position component as described with reference to FIGS. 6 through 9.

At 1125, the UE may calculate a position of the object relative to the selected reference entity based on the first position and the second position. The operations of 1125 may be performed according to the methods described herein. In some examples, aspects of the operations of 1125 may be performed by a position component as described with reference to FIGS. 6 through 9.

At 1130, the UE may transmit, to the second UE, an SSM including the position of the object relative to the selected reference entity and an indication of the selected reference entity. The operations of 1130 may be performed according to the methods described herein. In some examples, aspects of the operations of 1130 may be performed by an SSM component as described with reference to FIGS. 6 through 9.

Figure 12:
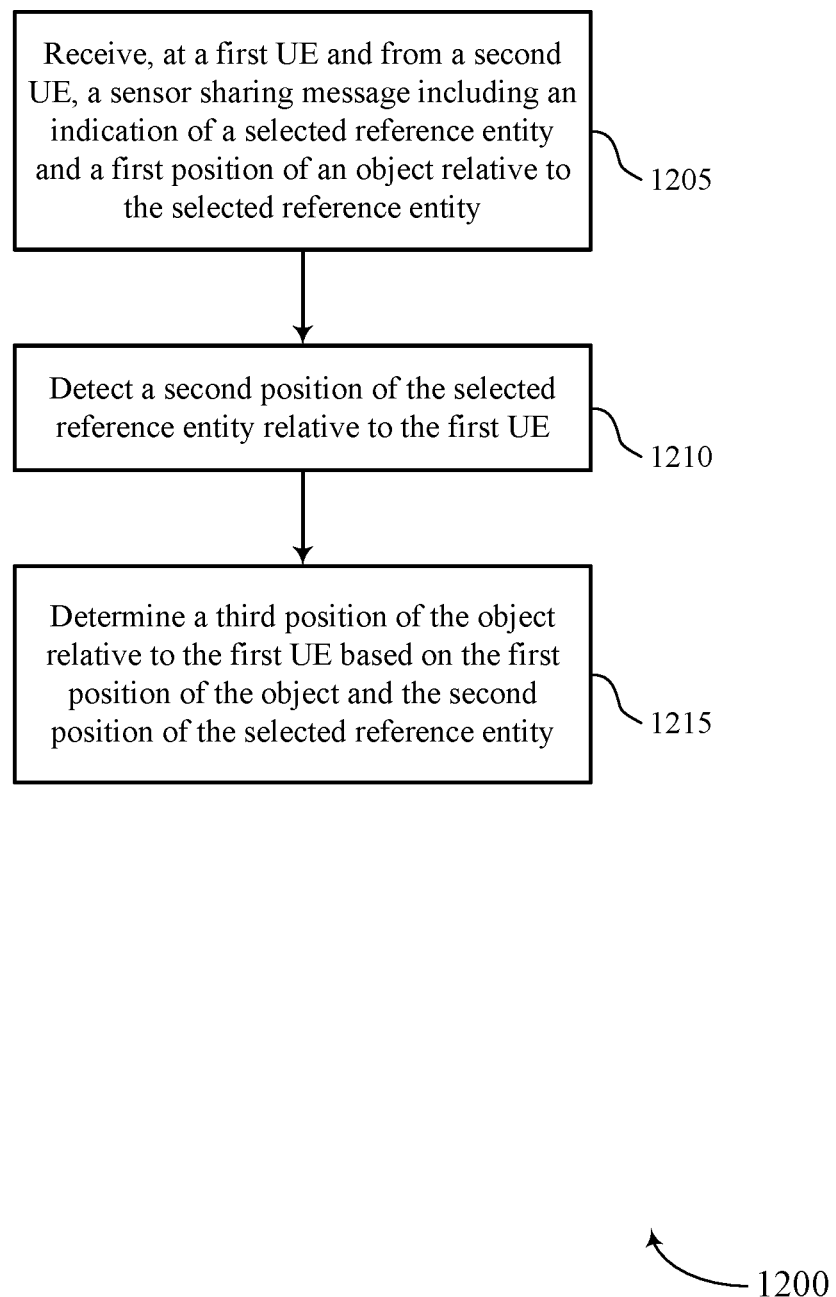

FIG. 12 shows a flowchart illustrating a method 1200 that supports alternative coordinate system for sensor sharing in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the UE (e.g., a first UE) may receive, from a second UE, an SSM including an indication of a selected reference entity and a first position of an object relative to the selected reference entity. The operations of 1205 may be performed according to the methods described herein. In some examples, aspects of the operations of 1205 may be performed by an SSM receiving component as described with reference to FIGS. 6 through 9.

At 1210, the UE may detect a second position of the selected reference entity relative to the first UE. The operations of 1210 may be performed according to the methods described herein. In some examples, aspects of the operations of 1210 may be performed by a reference detection component as described with reference to FIGS. 6 through 9.

At 1215, the UE may determine a third position of the object relative to the first UE based on the first position of the object and the second position of the selected reference entity. The operations of 1215 may be performed according to the methods described herein. In some examples, aspects of the operations of 1215 may be performed by a position component as described with reference to FIGS. 6 through 9.

Figure 13:
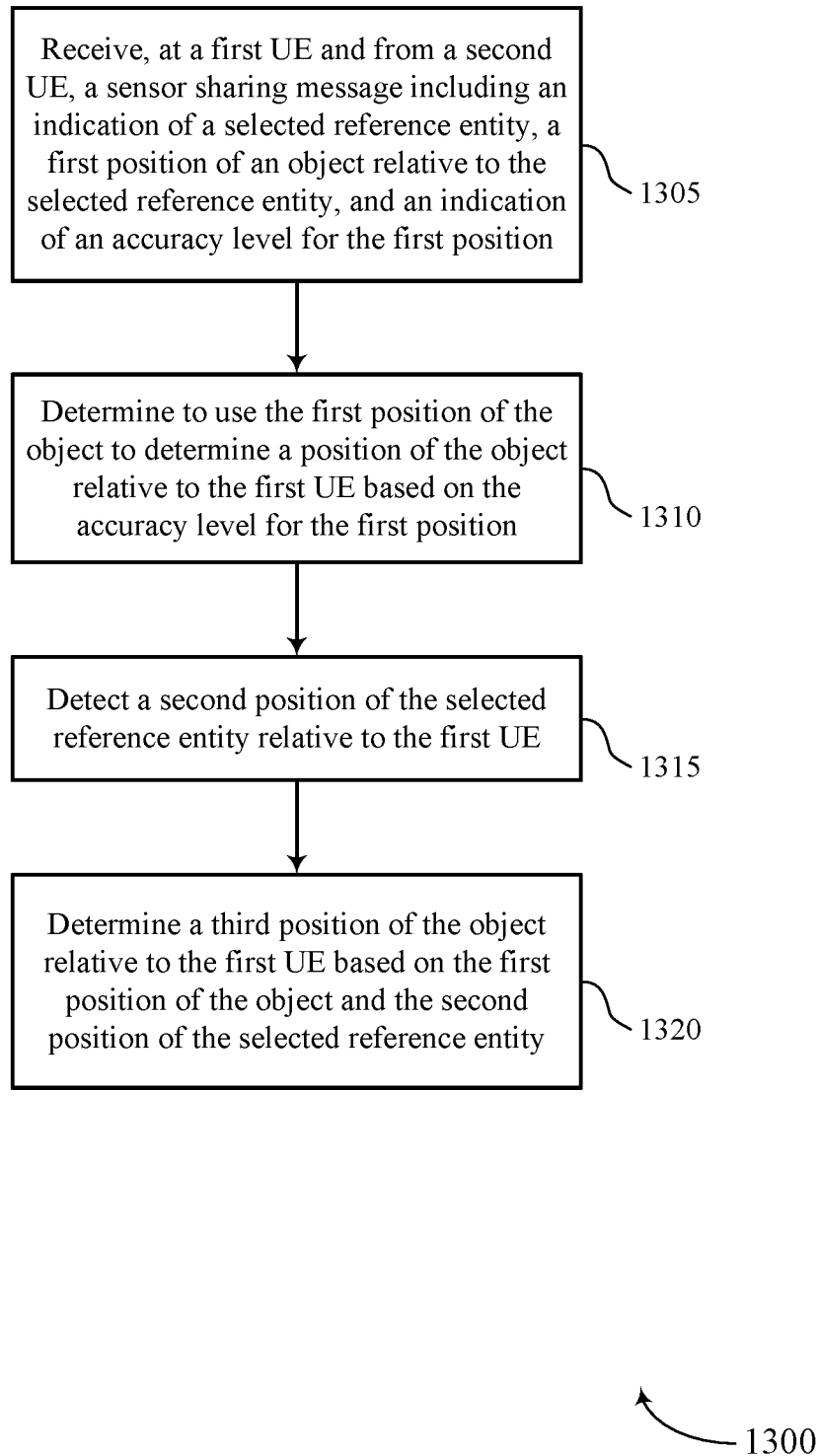

FIG. 13 shows a flowchart illustrating a method 1300 that supports alternative coordinate system for sensor sharing in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1305, the UE may receive, from a second UE, an SSM including an indication of a selected reference entity, a first position of an object relative to the selected reference entity, and an indication of an accuracy level for the first position. The operations of 1305 may be performed according to the methods described herein. In some examples, aspects of the operations of 1305 may be performed by an SSM receiving component as described with reference to FIGS. 6 through 9.

At 1310, the UE may determine to use the first position of the object to determine a position of the object relative to the first UE based on the accuracy level for the first position. The operations of 1310 may be performed according to the methods described herein. In some examples, aspects of the operations of 1310 may be performed by an SSM receiving component as described with reference to FIGS. 6 through 9.

At 1315, the UE may detect a second position of the selected reference entity relative to the first UE. The operations of 1315 may be performed according to the methods described herein. In some examples, aspects of the operations of 1315 may be performed by a reference detection component as described with reference to FIGS. 6 through 9.

At 1320, the UE may determine a third position of the object relative to the first UE based on the first position of the object and the second position of the selected reference entity. The operations of 1320 may be performed according to the methods described herein. In some examples, aspects of the operations of 1320 may be performed by a position component as described with reference to FIGS. 6 through 9.

The following provides an overview of aspects of the present disclosure:

Aspect 1: A method for wireless communications at a first UE, comprising: detecting and object; selecting a reference entity detectable by a second UE; determining a position of the object relative to the selected reference entity; and transmitting, to the second UE, a SSM comprising the position of the object relative to the selected reference entity and an indication of the selected reference entity.

Aspect 2: The method of aspect 1, wherein determining the position of the object relative to the selected reference entity comprises: determining a first position of the object relative to the first UE; determining a second position of the selected reference entity relative to the first UE; and calculating the position of the object relative to the selected reference entity based at least in part on the first position of the second position.

Aspect 3: The method of aspects 1 through 2, wherein: the position of the object relative to the selected reference entity comprises a first position of the object; and the SSM further comprises a second position of the object relative to the first UE and an absolute position of the first UE.

Aspect 4: The method of aspect 3, further comprising: determining the absolute position of the first UE using a positioning system, wherein the positioning system comprises a global positioning system, a global navigation satellite system, or both.

Aspect 5: The method of aspects 3 through 4, further comprising: determining an accuracy level for the absolute position of the first UE based at least in part on a positioning system for the first UE, the SSM further comprising an indication of the accuracy level for the absolute position of the first UE.

Aspect 6: The method of aspects 1 through 5, wherein the SSM further comprises an indication of an accuracy level for the position of the object.

Aspect 7: The method of aspects 1 through 6, wherein: the indication of the selected reference entity comprises a position of the selected reference entity relative to the first UE; and the SSM further comprises an indication of an accuracy level for the position of the selected reference entity.

Aspect 8: The method of aspects 1 through 7, wherein selecting the reference entity comprises: selecting the reference entity based at least in part on a predicted observability metric associated with eh reference entity.

Aspect 9: The method of aspects 1 through 8, wherein selecting the reference entity comprises: receiving, from a plurality of UEs, a plurality of SSMs comprising respective lists of detected entities; and selecting the reference entity from a set of candidate entities common to the respective list of detected entities for the plurality of SSMs.

Aspect 10: The method of aspects 1 through 9, wherein selecting the reference entity comprises: receiving, from a plurality of UEs, a plurality of indicators associated with respective local HD maps for the plurality of UEs; and selecting the reference entity from a set of candidate entities marked in each local HD map of the respective local HD maps for the plurality of UEs based at least in part on the plurality of indicators.

Aspect 11: The method of aspects 1 through 10, wherein selecting the reference entity comprises: transmitting, to the second UE, a first SSM indicating a plurality of candidate entities, wherein the SSM comprises a second SSM; receiving, from the second UE, a response message indicating a preferred entity of the plurality of candidate entities; and selecting the reference entity based at least in part on the preferred entity.

Aspect 12: The method of aspects 1 through 11, further comprising: transmitting, to the second UE, a first SSM indicating a capability of the first UE to transmit the position of the object relative to the selected reference entity, wherein the SSM comprises a second SSM; and receiving, from the second UE, a response message comprising an interest indicator for receiving the position of the object relative to the selected reference entity, wherein the second SSM comprises the position of the object relative to the selected reference entity based at least in part on the interest indicator.

Aspect 13: The method of aspect 12, wherein the response message further comprises a plurality of candidate entities selected by the second UE and wherein selecting the reference entity comprises: selecting the reference entity based at least in part on the plurality of candidate entities.

Aspect 14: The method of aspects 1 through 13, wherein the object is detected using a sensor equipped to the first UE, the sensor comprising a last incident detection and ranging sensor, a radar sensor, a camera-based sensor, a long range scanning sensor, a forward-mounted object detection sensor, a mid-range blind spot detection sensor, a long-range lane change assist sensor, or any combination thereof.

Aspect 15: The method of aspect 14, further comprising: detecting the reference entity using the sensor; and determining to transmit the position of the object relative to the selected reference entity in the sensor sharing message based at least in part on detecting both the object and the reference entity using a same sensor.

Aspect 16: The method of aspect 1 through 15, further comprising: receiving, from an RSU, an absolute position of the selected reference entity, wherein the position of the object relative to the selected reference entity is determined based at least in part on the absolute position of the selected reference entity.

Aspect 17: The method of aspects 1 through 16, wherein: the selected reference entity corresponds to a fixed position; and the object comprises a VRU, a vehicle, an obstacle, or a combination thereof.

Aspect 18: A method for wireless communications at a first UE comprising: receiving, from a second UE, a SSM comprising an indication of a selected reference entity and a first position of an object relative to the selected reference entity; detecting a second position of the selected reference entity relative to the first UE; and determining a third position of the selected reference entity relative to the first UE and determining a third position of the object relative to the first UE based at least in part on the first position of the object and the second position of the selected reference entity.

Aspect 19: A method of aspect 18, wherein the SSM further comprises a fourth position of the object relative to the second UE and an absolute position of the second UE.

Aspect 20: A method of aspect 19, wherein the SSM further comprises an indication of an accuracy level for the absolute position of the second UE, the method further comprising: determining to use the first position of the object to determine the third position of the object relative to the first UE based at least in part on the accuracy level for the absolute position of the second UE satisfying a threshold value.

Aspect 21: A method of aspects 18 through 20, wherein the sensor sharing message further comprises an indication of an accuracy level for the first position of the object relative to the selected reference entity, the method further comprising: determining to use the first position of the object to determine the third position of the object relative to the first UE based at least in part on the accuracy level for the first position of the object satisfying a threshold value.

Aspect 22: A method of aspects 18 through 21, wherein: the indication of the selected reference entity comprises a fourth position of the selected reference entity relative to the second UE; and the second position of the selected reference entity relative to the first UE is detected based at least in part on the fourth position of the selected reference entity relative to the second UE.

Aspect 23: A method of aspects 18 through 22, further comprising: transmitting, to the second UE, a first SSM comprising a list of detected entities, wherein the SSM comprises a second SSM and the selected reference entity is selected from the list of detected entities.

Aspect 24: A method of aspects 18 through 23, further comprising: transmitting, to the second UE, an indicator associated with a local HD map, wherein the selected reference entity is selected from a set of candidate entities marked in the local HD map.

Aspect 25: A method of aspects 18 through 24, further comprising: receiving, from the second UE, a first SSM indicating a plurality of candidate entities, wherein the SSM comprises a second SSM; and transmitting, to the second UE, a response message indicating a preferred entity of the plurality of candidate entities, wherein the selected reference entity is based at least in part on the preferred entity.

Aspect 26: A method of aspects 18 through 25, further comprising: receiving, from the second UE, a first SSM indicating a capability of the first UE to transmit the first position of the object relative to the selected reference entity, wherein the SSM comprises a second SSM; and transmitting, to the second UE a response message comprising an interest indicator for receiving the first position of the object relative to the selected reference entity, wherein the second SSM comprises the first position of the object relative to the selected reference entity based at least in part on the interest indicator.

Aspect 27: A method of aspect 26, further comprising: selecting a plurality of candidate entities, wherein the response message further comprises the plurality of candidate entities and the selected reference entity is based at least in part on the plurality of candidate entities.

Aspect 28: A method of aspects 18 through 27, further comprising: detecting the selected reference entity using a sensor equipped to the first UE, the sensor comprising a lidar sensor, a radar sensor, a camera-based sensor, a long range scanning sensor, a forward-mounted object detection sensor, a mid-range blind spot detection sensor, a long-range lane change assist sensor, or any combination thereof.

Aspect 29: An apparatus for wireless communication at a UE, comprising a processor; memory coupled with the processor; and instructions stored in the memory and executable by the processor to cause the apparatus to perform a method of any of aspects 1 through 17.

Aspect 30: An apparatus for wireless communication at a UE, comprising at least one means for performing a method of any aspects 1 through 17.

Aspect 31: A non-transitory computer-readable medium storing code for wireless communication at a UE, the code comprising instructions executable by a processor to perform a method of any of aspects 1 through 17.

Aspect 32: An apparatus for wireless communication at a UE, comprising a processor; memory coupled with the processor; and instructions stored in the memory and executable by the processor to cause the apparatus to perform a method of any of aspects 18 through 28.

Aspect 33: An apparatus for wireless communication at a UE, comprising at least one means for performing a method of any aspects 18 through 28.

Aspect 34: A non-transitory computer-readable medium storing code for wireless communication at a UE, the code comprising instructions executable by a processor to perform a method of any of aspects 18 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:
   one or more processors;
   memory coupled with the one or more processors; and
   instructions stored in the memory and executable by the one or more processors to cause the apparatus to:
   detect an object;
   select a reference entity detectable by a second UE;
   determine a position of the object relative to the selected reference entity; and
   transmit, to the second UE, a sensor sharing message comprising the position of the object relative to the selected reference entity and an indication of the selected reference entity.

2. The apparatus of claim 1, wherein the instructions to determine the position of the object relative to the selected reference entity are executable by the processor to cause the apparatus to:
   determine a first position of the object relative to the first UE;
   determine a second position of the selected reference entity relative to the first UE; and
   calculate the position of the object relative to the selected reference entity based at least in part on the first position and the second position.

3. The apparatus of claim 1, wherein:
   the position of the object relative to the selected reference entity comprises a first position of the object; and
   the sensor sharing message further comprises a second position of the object relative to the first UE and an absolute position of the first UE.

4. The apparatus of claim 3, wherein the instructions are further executable by the processor to cause the apparatus to:
   determine the absolute position of the first UE using a positioning system, wherein the positioning system comprises a global positioning system, a global navigation satellite system, or both.

5. The apparatus of claim 3, wherein the instructions are further executable by the processor to cause the apparatus to:
   determine an accuracy level for the absolute position of the first UE based at least in part on a positioning system for the first UE, the sensor sharing message further comprising an indication of the accuracy level for the absolute position of the first UE.

6. The apparatus of claim 1, wherein the sensor sharing message further comprises an indication of an accuracy level for the position of the object.

7. The apparatus of claim 1, wherein:
   the indication of the selected reference entity comprises a position of the selected reference entity relative to the first UE; and
   the sensor sharing message further comprises an indication of an accuracy level for the position of the selected reference entity.

8. The apparatus of claim 1, wherein the instructions to select the reference entity are executable by the processor to cause the apparatus to:
   select the reference entity based at least in part on a predicted observability metric associated with the reference entity.

9. The apparatus of claim 1, wherein the instructions to select the reference entity are executable by the processor to cause the apparatus to:
   receive, from a plurality of UEs, a plurality of sensor sharing messages comprising respective lists of detected entities; and
   select the reference entity from a set of candidate entities common to the respective lists of detected entities for the plurality of sensor sharing messages.

10. The apparatus of claim 1, wherein the instructions to select the reference entity are executable by the processor to cause the apparatus to:
    receive, from a plurality of UEs, a plurality of indicators associated with respective local high-definition maps for the plurality of UEs; and
    select the reference entity from a set of candidate entities marked in each local high-definition map of the respective local high-definition maps for the plurality of UEs based at least in part on the plurality of indicators.

11. The apparatus of claim 1, wherein the instructions to select the reference entity are executable by the processor to cause the apparatus to:
transmit, to the second UE, a first sensor sharing message indicating a plurality of candidate entities, wherein the sensor sharing message comprises a second sensor sharing message;
receive, from the second UE, a response message indicating a preferred entity of the plurality of candidate entities; and
select the reference entity based at least in part on the preferred entity.

12. The apparatus of claim 1, wherein the instructions are further executable by the processor to cause the apparatus to:
transmit, to the second UE, a first sensor sharing message indicating a capability of the first UE to transmit the position of the object relative to the selected reference entity, wherein the sensor sharing message comprises a second sensor sharing message; and
receive, from the second UE, a response message comprising an interest indicator for receiving the position of the object relative to the selected reference entity, wherein the second sensor sharing message comprises the position of the object relative to the selected reference entity based at least in part on the interest indicator.

13. The apparatus of claim 12, wherein the response message further comprises a plurality of candidate entities selected by the second UE and the instructions to select the reference entity are executable by the processor to cause the apparatus to:
select the reference entity based at least in part on the plurality of candidate entities.

14. The apparatus of claim 1, wherein the object is detected using a sensor equipped to the first UE, the sensor comprising a laser incident detection and ranging sensor, a radar sensor, a camera-based sensor, a long range scanning sensor, a forward-mounted object detection sensor, a mid-range blind spot detection sensor, a long-range lane change assist sensor, or any combination thereof.

15. The apparatus of claim 14, wherein the instructions are further executable by the processor to cause the apparatus to:
detect the reference entity using the sensor; and
determine to transmit the position of the object relative to the selected reference entity in the sensor sharing message based at least in part on detecting both the object and the reference entity using a same sensor.

16. The apparatus of claim 1, wherein the instructions are further executable by the processor to cause the apparatus to:
receive, from a roadside unit, an absolute position of the selected reference entity, wherein the position of the object relative to the selected reference entity is determined based at least in part on the absolute position of the selected reference entity.

17. The apparatus of claim 1, wherein:
the selected reference entity corresponds to a fixed position; and
the object comprises a vulnerable road user, a vehicle, an obstacle, or a combination thereof.

18. An apparatus for wireless communications at a first user equipment (UE), comprising:
one or more processors;
memory coupled with the one or more processors; and
instructions stored in the memory and executable by the one or more processors to cause the apparatus to:
receive, from a second UE, a sensor sharing message comprising an indication of a selected reference entity and a first position of an object relative to the selected reference entity;
detect a second position of the selected reference entity relative to the first UE; and
determine a third position of the object relative to the first UE based at least in part on the first position of the object and the second position of the selected reference entity.

19. The apparatus of claim 18, wherein the sensor sharing message further comprises a fourth position of the object relative to the second UE and an absolute position of the second UE.

20. The apparatus of claim 19, wherein the sensor sharing message further comprises an indication of an accuracy level for the absolute position of the second UE, and the instructions are further executable by the processor to cause the apparatus to:
determine to use the first position of the object to determine the third position of the object relative to the first UE based at least in part on the accuracy level for the absolute position of the second UE satisfying a threshold value.

21. The apparatus of claim 18, wherein the sensor sharing message further comprises an indication of an accuracy level for the first position of the object relative to the selected reference entity, and the instructions are further executable by the processor to cause the apparatus to:
determine to use the first position of the object to determine the third position of the object relative to the first UE based at least in part on the accuracy level for the first position of the object satisfying a threshold value.

22. The apparatus of claim 18, wherein:
the indication of the selected reference entity comprises a fourth position of the selected reference entity relative to the second UE; and
the second position of the selected reference entity relative to the first UE is detected based at least in part on the fourth position of the selected reference entity relative to the second UE.

23. The apparatus of claim 18, wherein the instructions are further executable by the processor to cause the apparatus to:
transmit, to the second UE, a first sensor sharing message comprising a list of detected entities, wherein the sensor sharing message comprises a second sensor sharing message and the selected reference entity is selected from the list of detected entities.

24. The apparatus of claim 18, wherein the instructions are further executable by the processor to cause the apparatus to:
transmit, to the second UE, an indicator associated with a local high-definition map, wherein the selected reference entity is selected from a set of candidate entities marked in the local high-definition map.

25. The apparatus of claim 18, wherein the instructions are further executable by the processor to cause the apparatus to:
receive, from the second UE, a first sensor sharing message indicating a plurality of candidate entities, wherein the sensor sharing message comprises a second sensor sharing message; and
transmit, to the second UE, a response message indicating a preferred entity of the plurality of candidate entities, wherein the selected reference entity is based at least in part on the preferred entity.

26. The apparatus of claim 18, wherein the instructions are further executable by the processor to cause the apparatus to:
- receive, from the second UE, a first sensor sharing message indicating a capability of the first UE to transmit the first position of the object relative to the selected reference entity, wherein the sensor sharing message comprises a second sensor sharing message; and
- transmit, to the second UE, a response message comprising an interest indicator for receiving the first position of the object relative to the selected reference entity, wherein the second sensor sharing message comprises the first position of the object relative to the selected reference entity based at least in part on the interest indicator.

27. The apparatus of claim 26, wherein the instructions are further executable by the processor to cause the apparatus to:
select a plurality of candidate entities, wherein the response message further comprises the plurality of candidate entities and the selected reference entity is based at least in part on the plurality of candidate entities.

28. The apparatus of claim 18, wherein the instructions are further executable by the processor to cause the apparatus to:
detect the selected reference entity using a sensor equipped to the first UE, the sensor comprising a laser incident detection and ranging sensor, a radar sensor, a camera-based sensor, a long range scanning sensor, a forward-mounted object detection sensor, a mid-range blind spot detection sensor, a long-range lane change assist sensor, or any combination thereof.

29. The apparatus of claim 18, wherein:
the selected reference entity corresponds to a fixed position; and
the object comprises a vulnerable road user, a vehicle, an obstacle, or a combination thereof.

* * * * *